US011465727B2

(12) United States Patent
Kepley et al.

(10) Patent No.: US 11,465,727 B2
(45) Date of Patent: Oct. 11, 2022

(54) COMPUTER-CONTROLLED SYNCHRONOUS ROTATION

(71) Applicant: LTA Research and Exploration, LLC, Palo Alto, CA (US)

(72) Inventors: Franklin Kyle Kepley, Milpitas, CA (US); Robert Everett Smith, San Mateo, CA (US); Daniel Alejandro Ziperovich, San Mateo, CA (US); Richard Austin Salle, Santa Clara, CA (US); Viet Quoc Le, San Francisco, CA (US); Jesus Ricardo Amezquita Zatarain, San Jose, CA (US); David Andrew Sanchez, San Luis Obispo, CA (US); Tsu Kuang Han, San Jose, CA (US); Benjamin Eric Loveless, San Francisco, CA (US); Marlon Fernando Perez, San Jose, CA (US)

(73) Assignee: LTA Research and Exploration, LLC, Palo Alto, CA (US)

( * ) Notice: Subject to any disclaimer, the term of this patent is extended or adjusted under 35 U.S.C. 154(b) by 112 days.

(21) Appl. No.: 17/126,544

(22) Filed: Dec. 18, 2020

(65) Prior Publication Data

US 2022/0194545 A1 Jun. 23, 2022

(51) Int. Cl.
*B64B 1/12* (2006.01)
*B64B 1/08* (2006.01)
*B64F 5/10* (2017.01)

(52) U.S. Cl.
CPC ............... *B64B 1/12* (2013.01); *B64B 1/08* (2013.01); *B64F 5/10* (2017.01)

(58) Field of Classification Search
CPC ............... B64B 1/12; B64B 1/08; B64F 5/10
See application file for complete search history.

(56) References Cited

U.S. PATENT DOCUMENTS

| 9,266,597 | B1* | 2/2016 | Pasternak | B64B 1/08 |
| 2013/0277496 | A1* | 10/2013 | Kraus | B64B 1/08 244/125 |
| 2019/0112023 | A1* | 4/2019 | Brin | B64B 1/08 |

OTHER PUBLICATIONS

Slate (all-metal) Airship—the "City of Glendale", available at https://welweb.org/ThenandNow/City%20of%20Glendale.html, 13 pages.

* cited by examiner

*Primary Examiner* — Christopher D Hutchens
(74) *Attorney, Agent, or Firm* — Baker Botts L.L.P.

(57) ABSTRACT

In an embodiment, a system for synchronizing the rotation of multiple mainframes of an airship includes multiple belt drive systems configured to mechanically rotate the mainframes, a central control system for sending a timing instruction to cause the mainframes to rotate synchronously about their respective rotational axis, wherein the mainframes are axis-aligned about their respective rotational axes and the timing instruction specifies a desired angular displacement of the mainframes, and multiple control units for controlling the belt drive systems to rotate the mainframes, respectively, wherein, for each mainframe, the associated control unit is configured to: receive the timing instruction from the central control system; determine, according to the timing instruction, a rotation instruction based on a size of the mainframe and the desired angular displacement; and instruct the belt drive system controlled by the control unit to rotate the mainframe based on the rotation instruction.

13 Claims, 26 Drawing Sheets

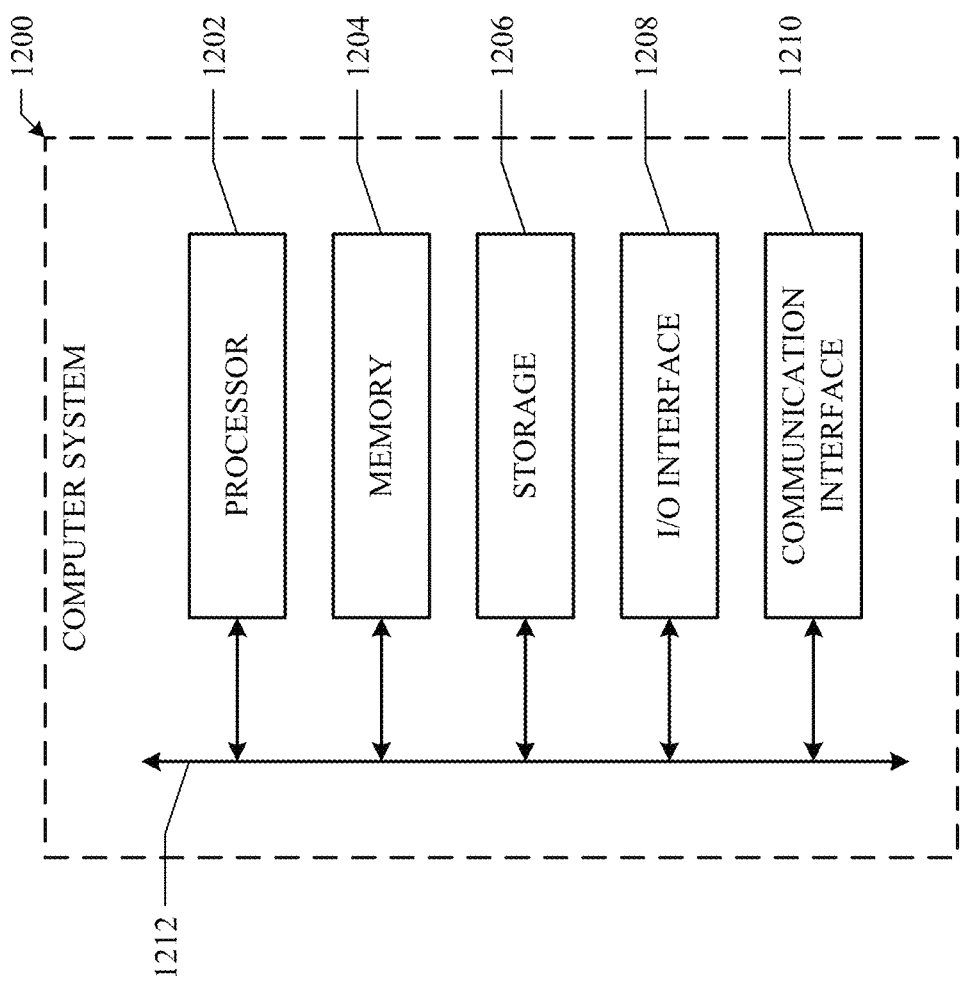

COMPUTER-CONTROLLED SYNCHRONOUS ROTATION

TECHNICAL FIELD

This disclosure generally relates to airships or lighter-than-air aircrafts, and more particularly to apparatuses, methods, and systems for constructing the same.

BACKGROUND

Airships are light-than-air aircrafts that obtain the necessary lift for flight based on buoyancy generated by gas that is less dense than the surrounding air. Typically, an airship comprises a structure attached to an envelope that holds lifting gas, such as helium or hydrogen. Certain airships, such as rigid or semi-rigid airships, may have structural framework to help maintain the shape of the envelop.

SUMMARY OF PARTICULAR EMBODIMENTS

Embodiments disclosed herein pertain to systems, apparatuses, and methods for providing fast and cost-effective ways to construct airships. In particular embodiments, the frame structure of an airship may be built using preconfigured joints designed to facilitate and simplify construction.

Further embodiments described herein enable an airship to be built on the ground, thereby enhancing construction safety, speed, and cost. In particular embodiments, wheel attachments may be attached to the outer surface of a mainframe, which may be circular, as it is being built. The partially assembled mainframe may then be placed on a semi-circular jig, with the attached wheels abutting the jig. Such configuration thus allows the mainframe to be rotated as it is being assembled by workers on the ground without subjecting the workers to unnecessary risks.

Additional embodiments described herein describe a system for synchronizing rotation of multiple mainframes of an airship, the system including multiple belt drive systems configured to mechanically rotate the mainframes, a central control system for sending a timing instruction to cause the mainframes to rotate synchronously about their respective rotational axis, wherein the mainframes are axis-aligned about their respective rotational axes and the timing instruction specifies a desired angular displacement of the mainframes, and multiple control units for controlling the belt drive systems to rotate the mainframes, respectively, wherein, for each mainframe, the associated control unit is configured to: receive the timing instruction from the central control system; determine, according to the timing instruction, a rotation instruction based on a size of the mainframe and the desired angular displacement; and instruct the belt drive system controlled by the control unit to rotate the mainframe based on the rotation instruction. In some embodiments, for each of the plurality of belt drive systems, the belt drive system includes a motor for rotating the associated mainframe. In some embodiments, for each of the plurality of belt drive systems, the associated motor is a stepper motor, and the rotation instruction specifies a number of steps for the stepper motor. Alternatively, the motor may be a DC motor or a servo motor with a shaft encoder that converts the angular position or motion of a shaft or axle to analog or digital output signals. In some embodiments, for each of the plurality of belt drive systems, the belt drive system includes a first belt wound around an outer circumference of the associated mainframe. In some embodiments, for each of the plurality of belt drive systems, the belt drive system includes a second belt wound around the outer circumference of the associated mainframe. In some embodiments, for each of the plurality of belt drive systems, the associated first belt is further wound around a gear of the associated motor. In some embodiments, for each of the plurality of belt drive systems, the associated first belt is a non-slipping drive belt. In some embodiments, for each of the plurality of belt drive systems, the associated first belt is secured to a plurality of anchors coupled to the outer circumference of the associated mainframe. In some embodiments, for each of the plurality of belt drive systems, the associated rotation instruction specifies a speed adjustment for the associated motor based on the size of the mainframe. In some embodiments, for each of the plurality of belt drive systems, the associated rotation instruction is partitioned into a plurality of smaller instructions, each smaller instruction separated by a delay to ensure the associated mainframe has a sufficient time to complete its rotation. In some embodiments, for each of the plurality of mainframes, the mainframe is erected on a rollercoaster jig for rotating the mainframe. In some embodiments, wherein each of the rollercoaster jigs corresponding to the plurality of mainframes is height-adjustable, to allow the plurality of mainframes to be axis-aligned about their respective rotational axes.

The embodiments disclosed herein are only examples, and the scope of this disclosure is not limited to them. Particular embodiments may include all, some, or none of the components, elements, features, functions, operations, or steps of the embodiments disclosed above. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 12 illustrates an example computer system.

DESCRIPTION OF EXAMPLE EMBODIMENTS

Figure 1:
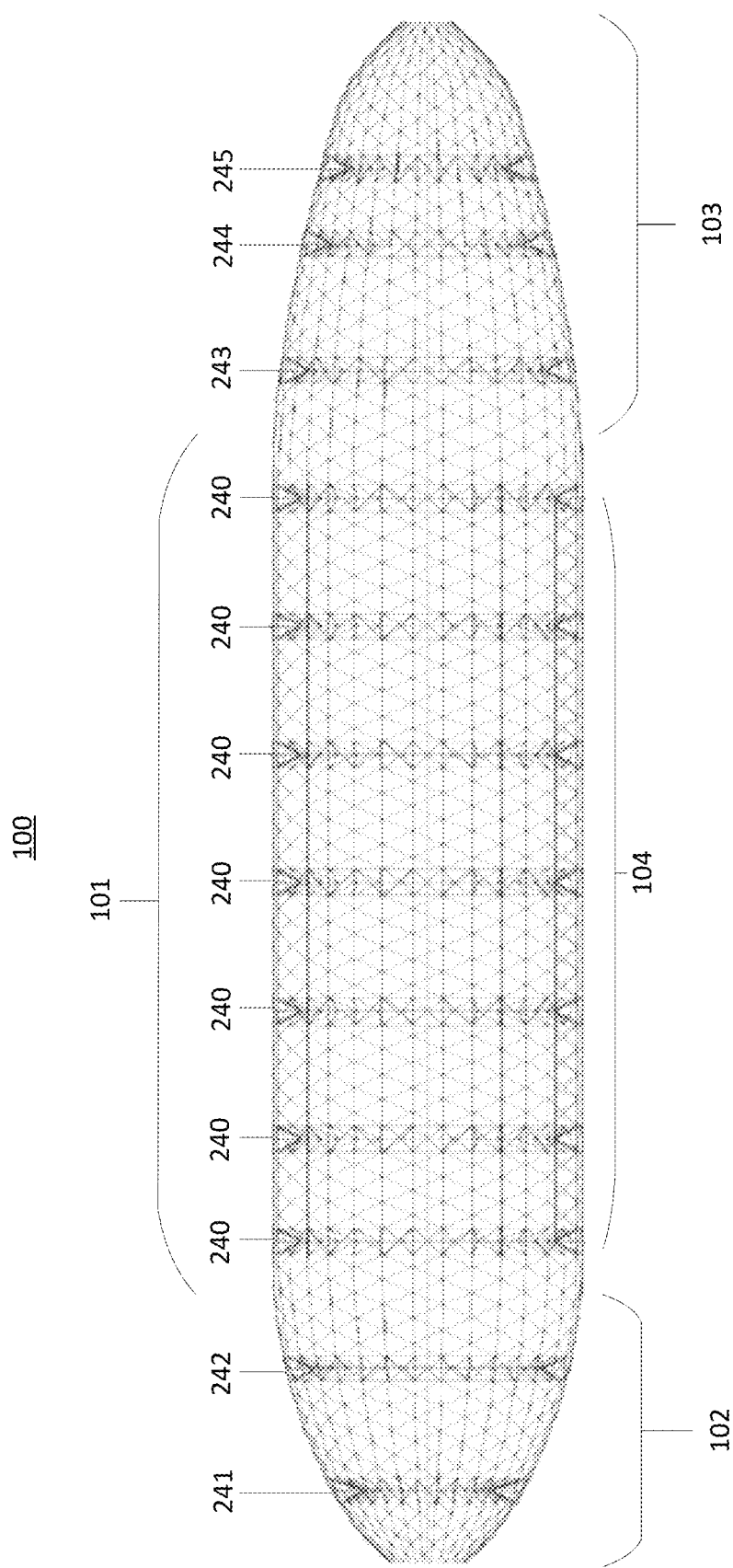
FIG. 1 illustrates an example structure of a rigid airship.

FIG. 1 illustrates an example structure 100 of a rigid airship. The structure 100 may comprise a hull section 101, bow section 102, and stern section 103 to which the airship's rudder may be attached. A hull section 101 may comprise multiple main transverse frames or mainframes with substantially similar attributes (e.g., radius, diameter, circumference, degree of tapering). For example, FIG. 1 illustrates a substantially cylindrical hull section 101 comprising a plurality of mainframes 240. A bow section 102 may comprise multiple mainframes different attributes. For example, FIG. 1 illustrates a tapered bow section 102 comprising tapered mainframes 241 and 242 with different attributes. A stern section 103 may comprise multiple mainframes different attributes. For example, FIG. 1 illustrates a tapered stern section 102 comprising tapered mainframes 243-245 with different attributes. Although FIG. 1 illustrates the structure 100 comprising seven mainframes 240 and five tapered mainframes 241-245, the disclosure of this application contemplates any number of mainframes and tapered mainframes used for constructing an airship. In particular embodiments, mainframes 240 may be interconnected using longitudinal gangways 104. In particular embodiments, the structure 100 may be divided into multiple segments via mainframes. For example, the hull section 101 illustrated in FIG. 1 may be partitioned into multiple segments at each of the mainframes 240 via wires that are connected across the inner area of the mainframes 240, such that the inner area is substantially covered by the wires. The wires may be constructed with Vectran fiber or any other suitable material with suitable strength and flexibility characteristics. Each of the segments of the structure 100 may be used to hold individual airbags containing lifting gas (e.g., helium, hydrogen, etc.).

Figure 2A:
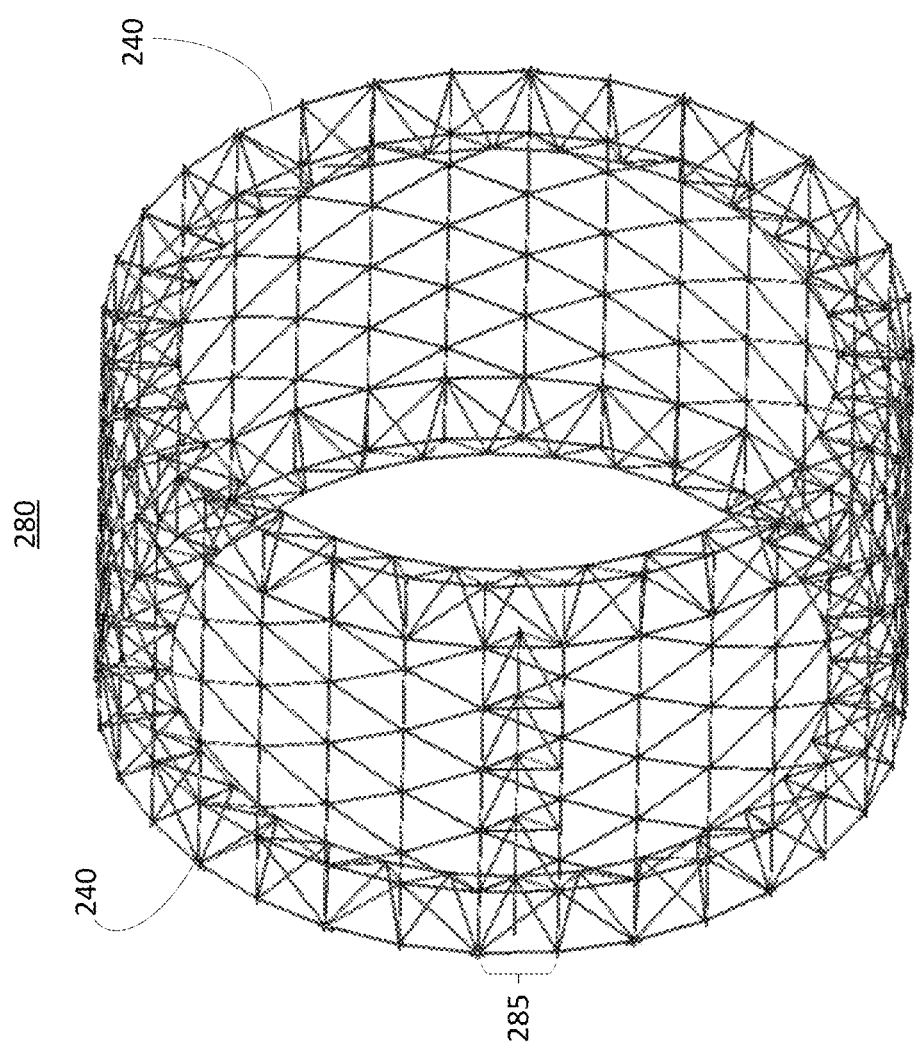
FIGS. 2A-2C illustrate an example hull segment of a hull section.
Figure 2B:
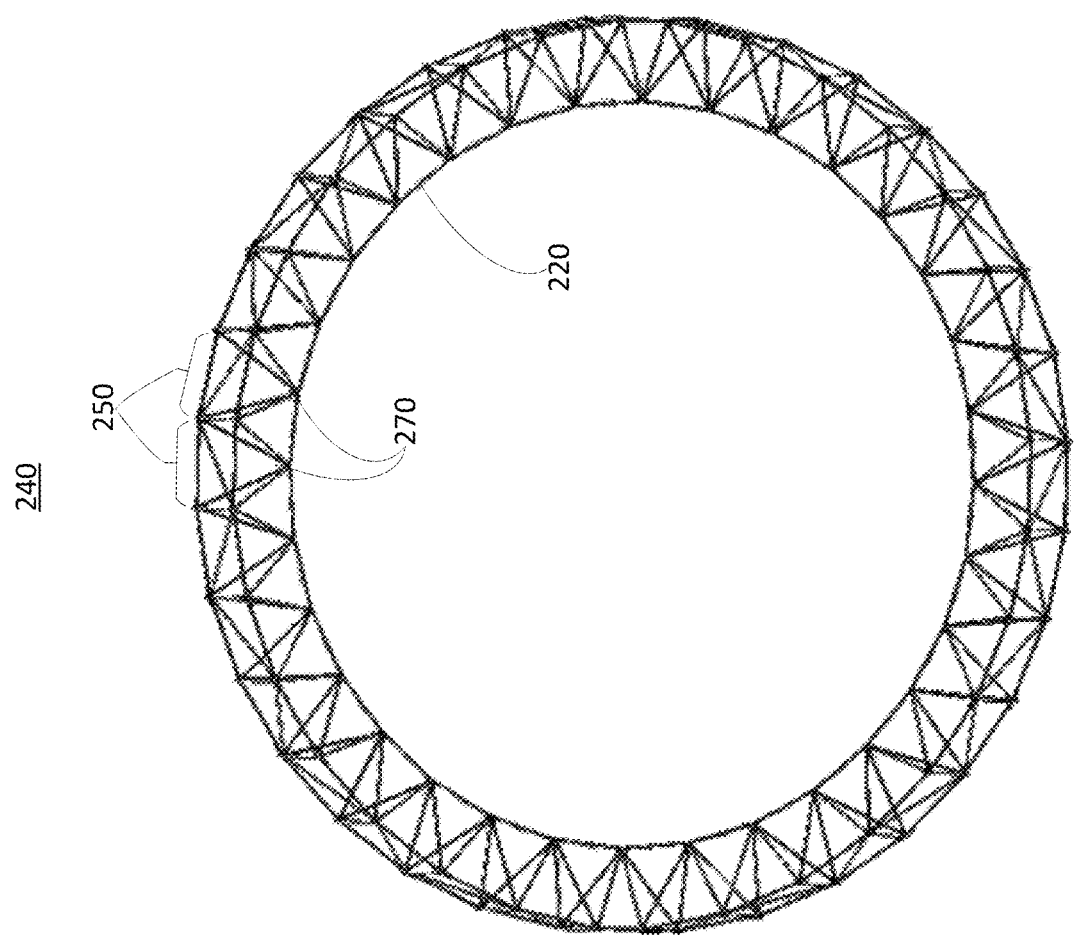
Figure 2C:
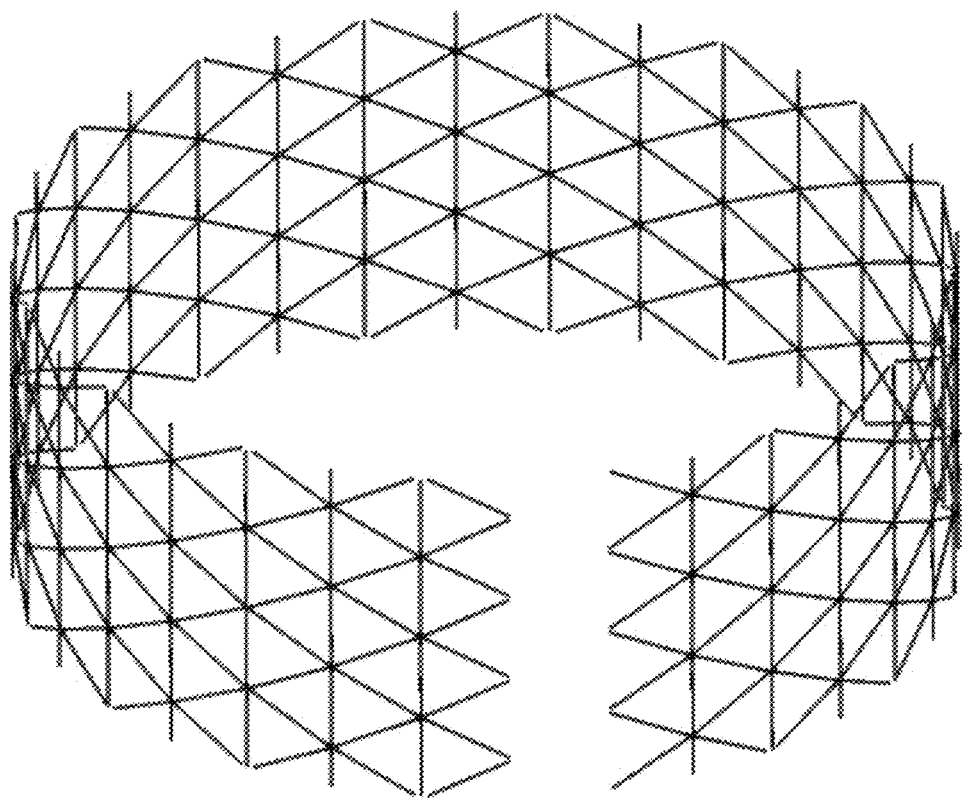

FIGS. 2A-2C illustrate an example hull segment 280 of a hull section 101. In particular embodiments, a hull segment 280 may be substantially cylindrical and comprised of mainframes, gangways, and geodesic structures. For example, FIG. 2A illustrates a hull segment 280 comprising two mainframes 240, which mainframes 240 are connected to each other via a gangway 285 and geodesic structure (e.g., illustrated in FIG. 2C as geodesic structure 290). In particular embodiments, segments of a bow section 102 and stern section 103 may be comprised of components such as mainframes, gangways, and geodesic structures in a substantially similar fashion as the hull segment 280 illustrated in FIG. 2A, except the structure of the components may be configured differently to account for any tapering of the bow section 102 and stern section 103, respectively.

In particular embodiments, a mainframe may be comprised of a plurality of pyramid structures. For example, FIG. 2B illustrates a non-tapered mainframe 240 comprising a plurality of pyramid structures 250, each pyramid structure 250 comprising a base and an apex. For each of the pyramid structures 250, its apex points toward the center of the mainframe and the base faces outwards. A mainframe's outer portion (i.e., outer circumference) may be comprised of bases of pyramid structures, and the mainframe's inner portion (i.e., inner circumference) may be comprised of apexes of pyramid structures. For example, FIG. 2B illustrates mainframe 240's outer circumference being formed by the bases of pyramid structures (e.g., pyramid structures 250), and the mainframe 240's inner circumference being formed by connectors connecting the apexes of the pyramid structures (e.g., connectors 220 connecting apexes 270). In particular embodiments, tapered mainframes may be constructed in a similar fashion as the non-tapered mainframes but with slightly different configurations to accommodate the tapered configuration.

Figure 3A:
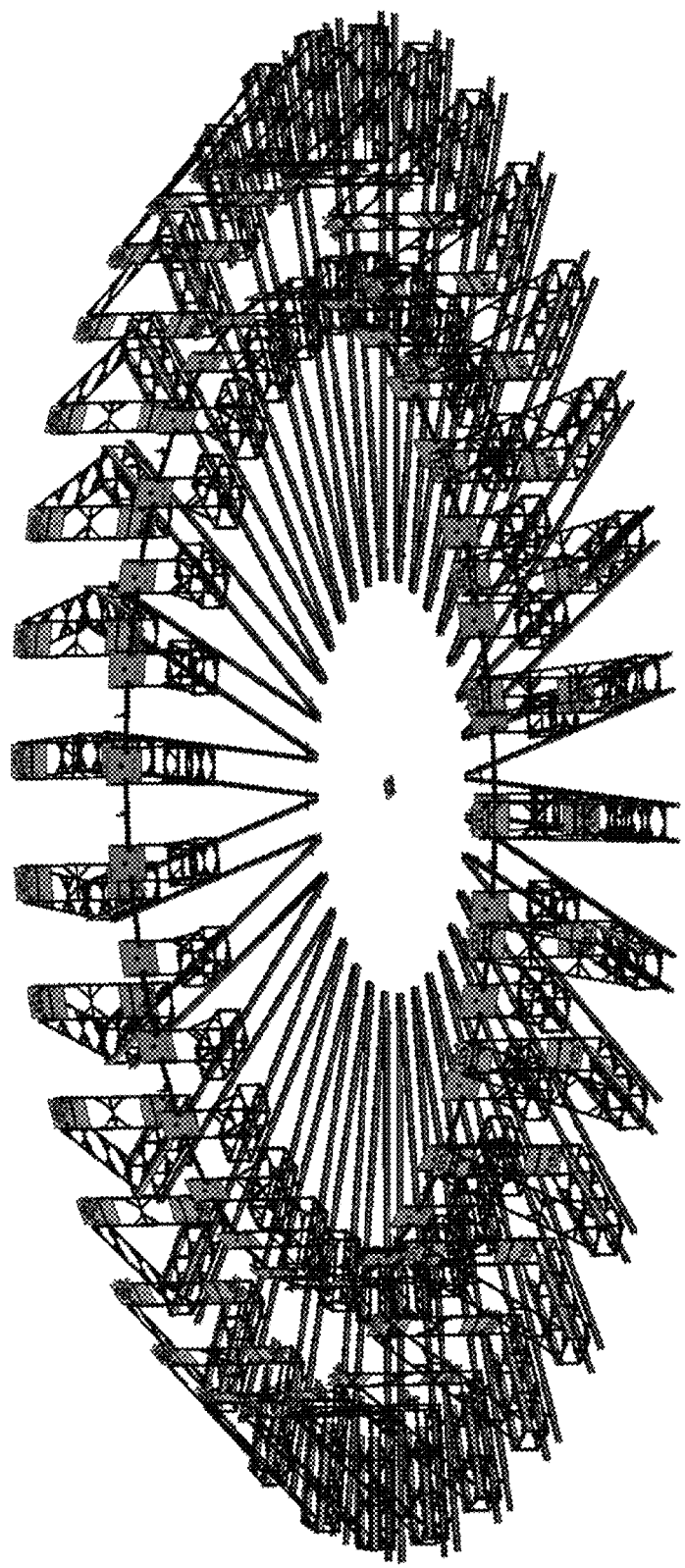
FIGS. 3A-3E illustrate an example of a universal mainframe jig used to construct mainframes of different sizes and configurations.
Figure 3B:
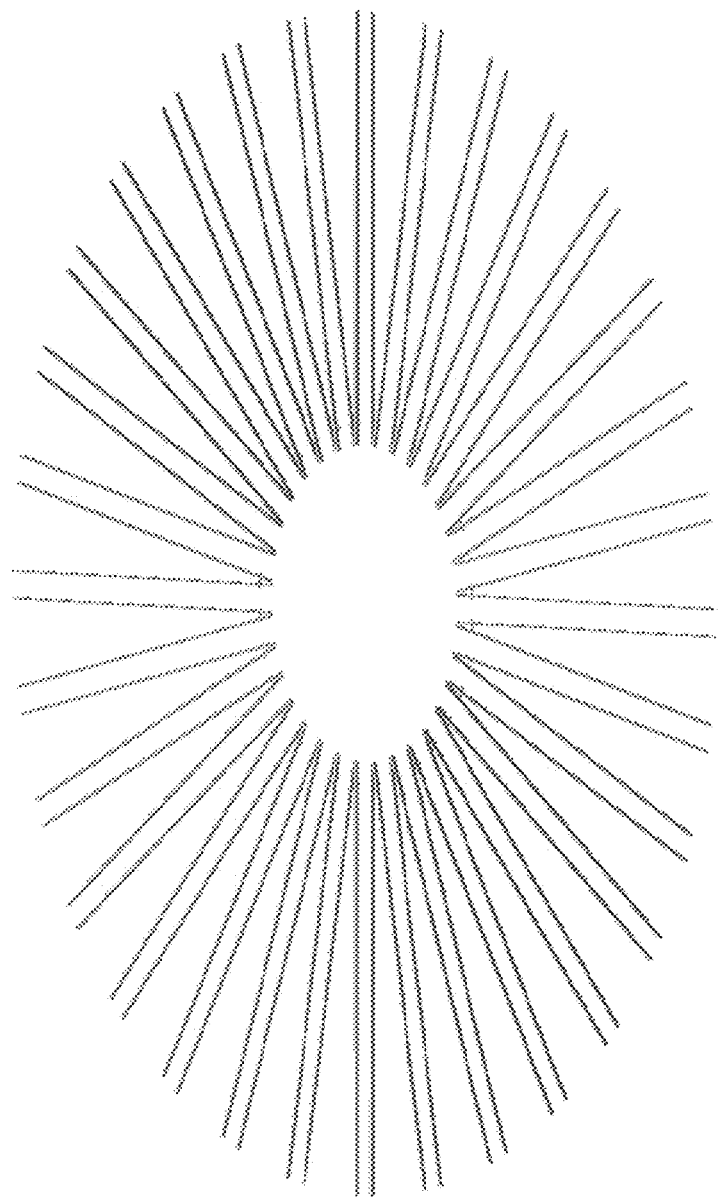
Figure 3C:
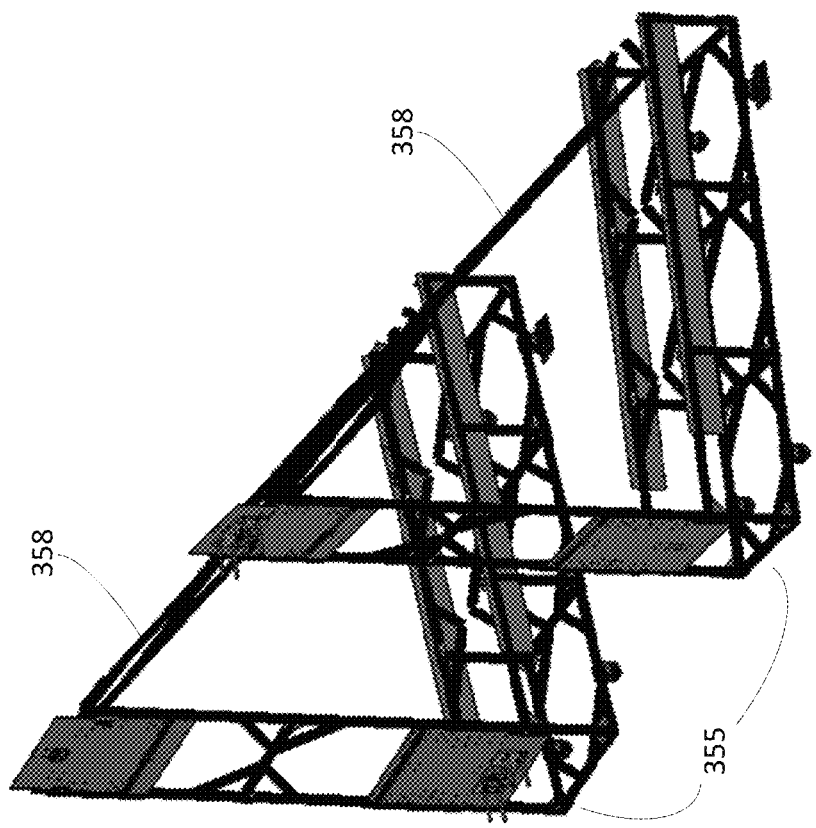
Figure 3C:
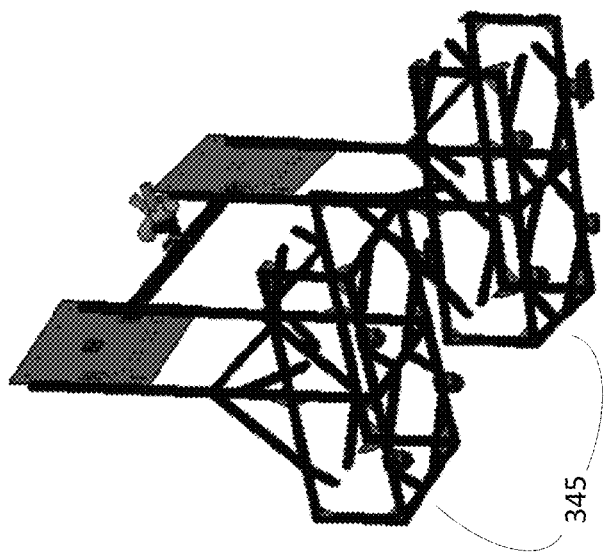
Figure 3D:
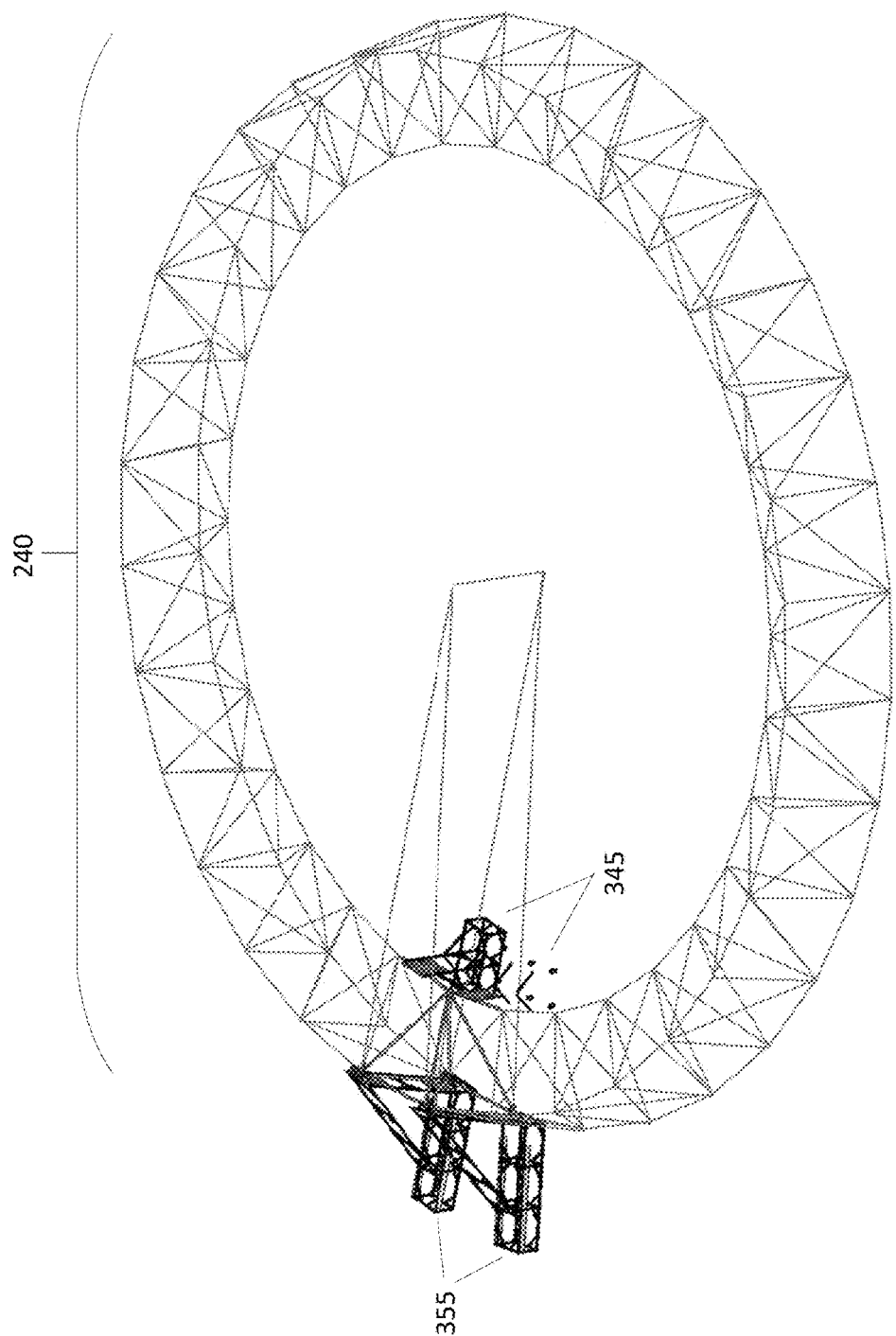
Figure 3E:
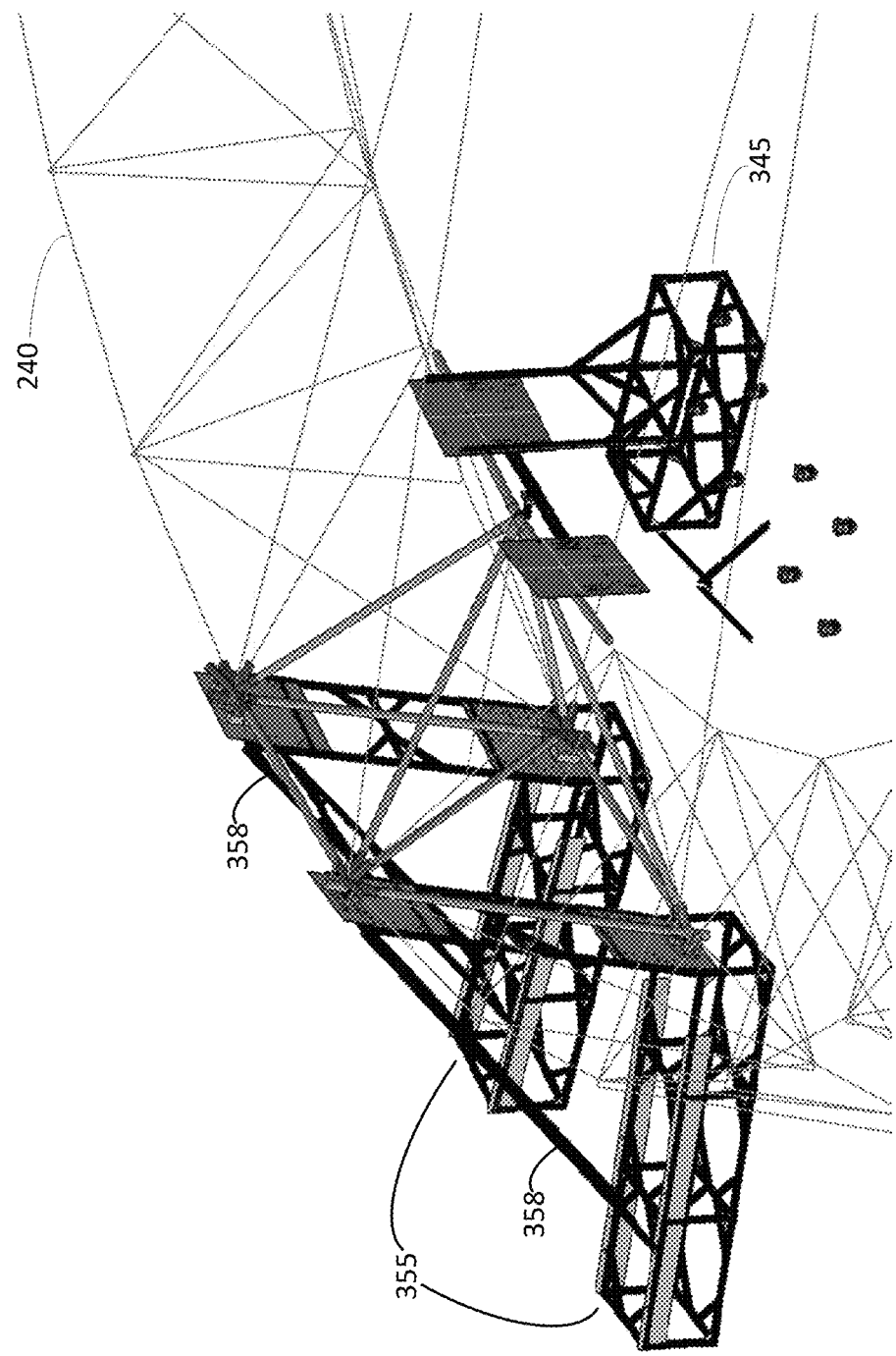

FIGS. 3A-3E illustrate an example of a universal mainframe jig 301 used to construct mainframes of different sizes and configurations. In particular embodiments, a universal mainframe jig 301 may be comprised of rails 303, front carts 345, and back carts 355. For example, FIG. 3A illustrates a universal mainframe jig 301 with front and back carts slidably configured on top of rails. FIG. 3B illustrates an example of rails 303. FIG. 3C illustrates an example of front carts 345 and back carts 355. A mainframe may be constructed on a universal mainframe jig 301 by assembling portions of the mainframe (e.g., joints and connectors) on the front carts 345 and back carts 355. For example, FIGS. 3D and 3E illustrate back carts 355 securing a portion of the outer circumference of a mainframe 240 and front carts 345 securing a portion of the inner circumference of the mainframe 240. As illustrated in FIG. 3A, a universal mainframe jig 301 may comprise front and back carts that are configured in a circular pattern on the ground level to allow the mainframes to be constructed on the ground level. In particular embodiments, front carts 345 and back carts 355 may be configured to slide along rails 303 to allow the construction of mainframes of various sizes (e.g., radius, diameter, and circumference). The distance from the center of the universal mainframe jig 301 to the front carts 345 corresponds to the radius of the mainframe constructed on the universal mainframe jig 301. Thus, for example, sliding the carts closer to the center of the universal mainframe jig 301 allows mainframes of a smaller size to be constructed. Alternatively, sliding the carts away from the center of the universal mainframe jig 301 allows mainframes of a larger size to be constructed. In particular embodiments, each track of the rails 303 may be configured with markers at predetermined locations to allow the carts to be uniformly distanced with respect to the center of a universal mainframe jig. Thus, for example, to construct a mainframe of a particular size, all of the front carts could be moved to a particular marker and all of the back carts could be moved to another marker. This allows all of the front carts and back carts to be uniformly distanced from the center. In particular embodiments, adjusting the configuration of back carts 355 and front carts 345 may allow the construction of tapered mainframes. For example, referring to FIG. 3E, by adjusting the length of the rods 358—thereby adjusting the top two base joints of the pyramid structure to be further away from the apex of the pyramid structure—the tapering of the mainframe may be adjusted. Once mainframes are constructed on a universal mainframe jig 301, the mainframes may be erected and placed on a rollercoaster jig.

Conventional methods of constructing an airship typically require the builders to climb great heights to work on portions of the airship that are far from the ground level. Such methods are inherently associated with dangers due to the risk of falling and construction inefficiencies since tools, equipment, and materials will need to be transported up and down from the elevated level. The invention described herein overcomes these dangers and improves the construction efficiencies by disclosing novel systems and methods that allow most of the construction to take place on the ground level.

Figure 4A:
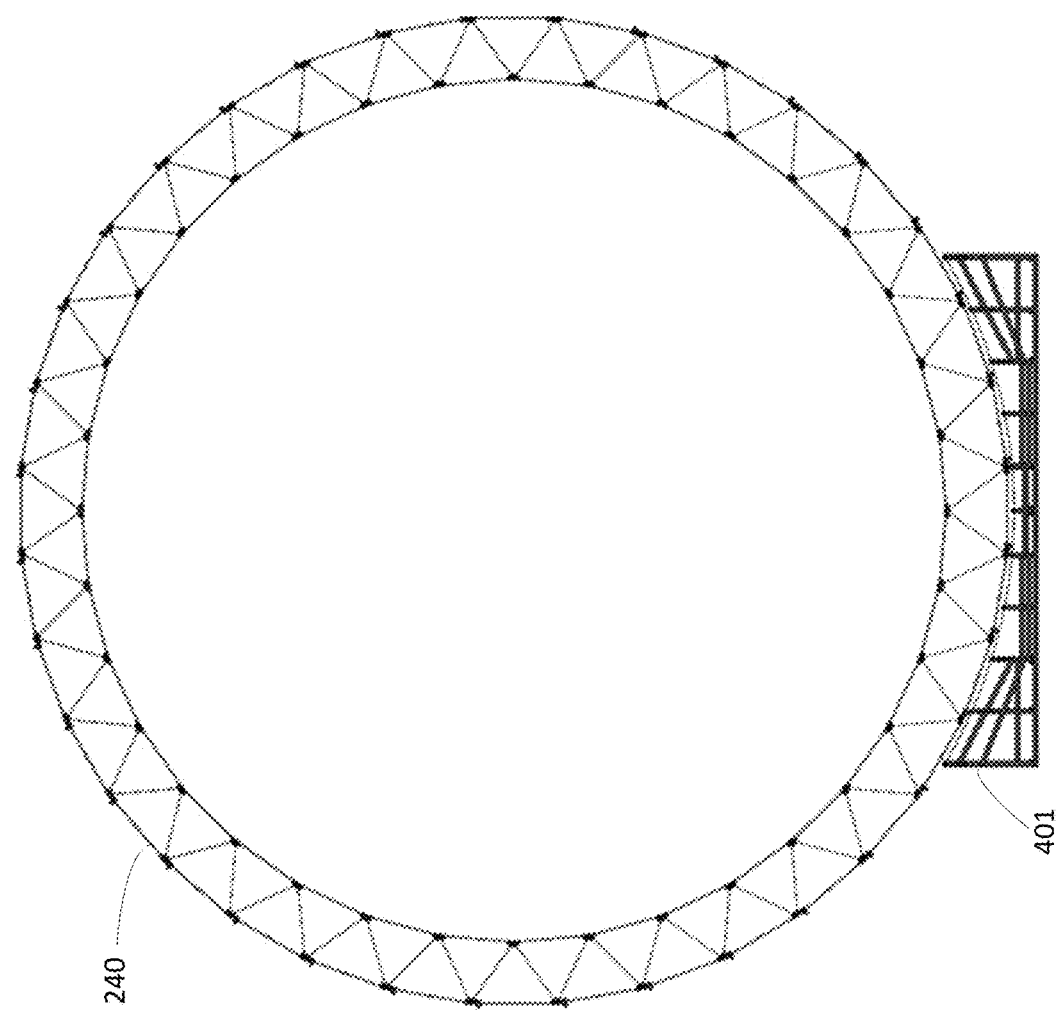
FIGS. 4A-4C illustrate an example a mainframe and rollercoaster jigs.
Figure 4B:
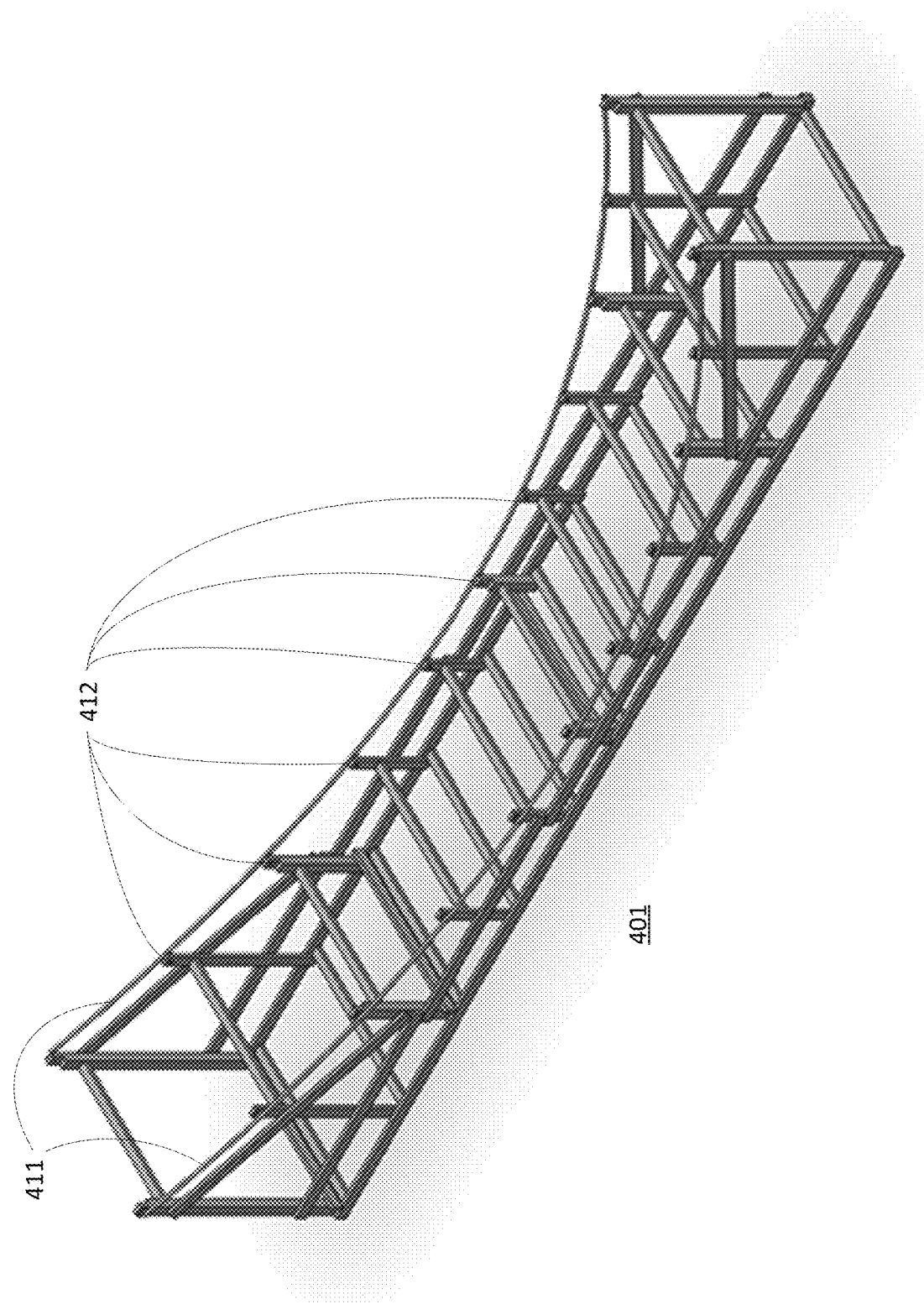
Figure 4C:
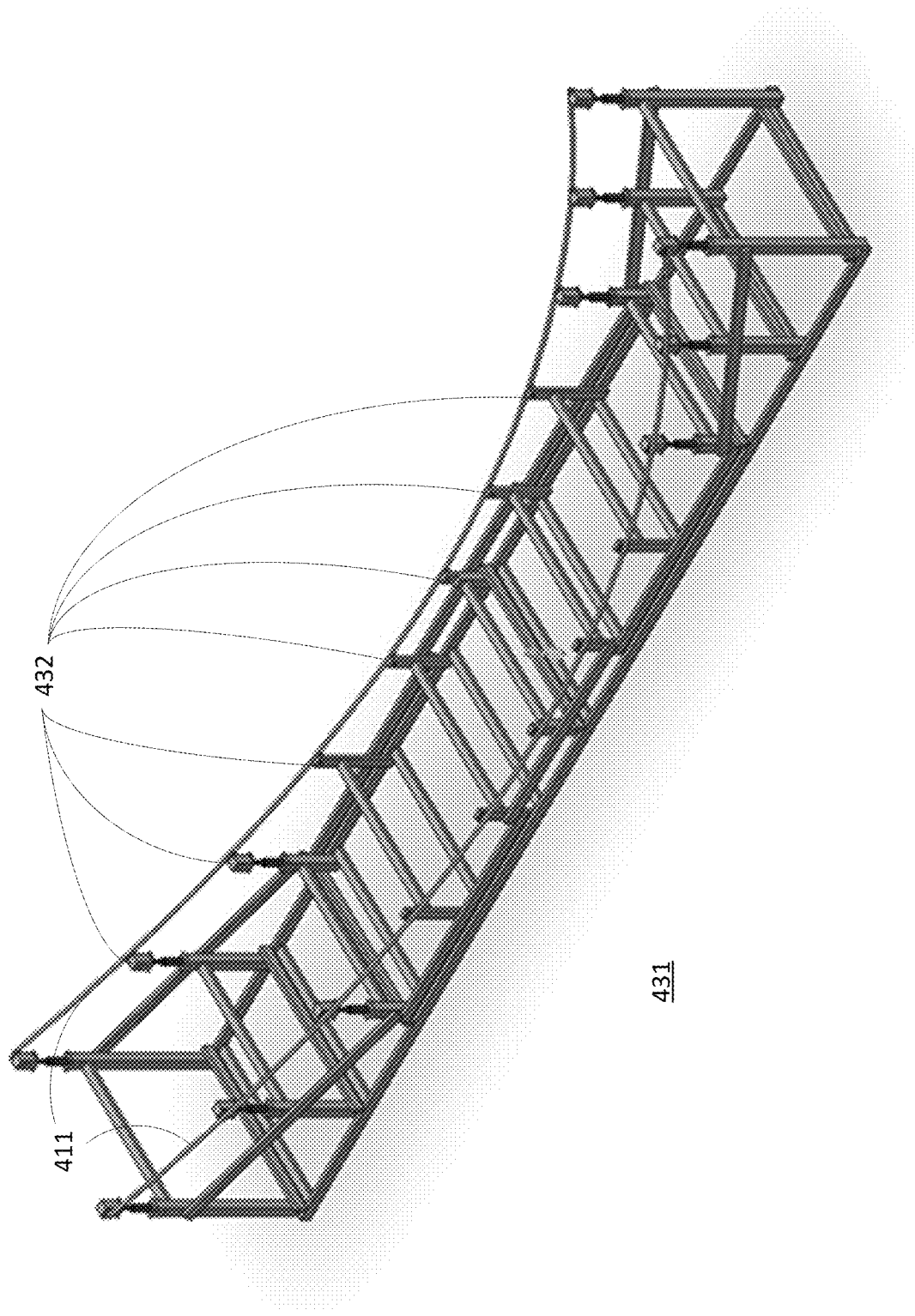

FIGS. 4A-4C illustrate examples of a mainframe erected on rollercoaster jigs. In particular embodiments, a rollercoaster jig may have a pair of rails running parallel to one another, as illustrated in FIG. 4B. The distance between the parallel rails 411 may depend on the width of the mainframe which the rollercoaster jig is designed to support. The rails of a rollercoaster jig may be configured as an arc corresponding to the curvature of the mainframe. In embodiments such as those illustrated in FIG. 4B, rails 411 may be affixed to stationary supporting structures 412 (e.g., with fixed heights). In embodiments such as those illustrated in FIG. 4C, rails 411 may be affixed to adjustable supporting structures 432 that can be raised or lowered to accommodate various sizes and degrees of tapering of mainframes.

Figure 5A:
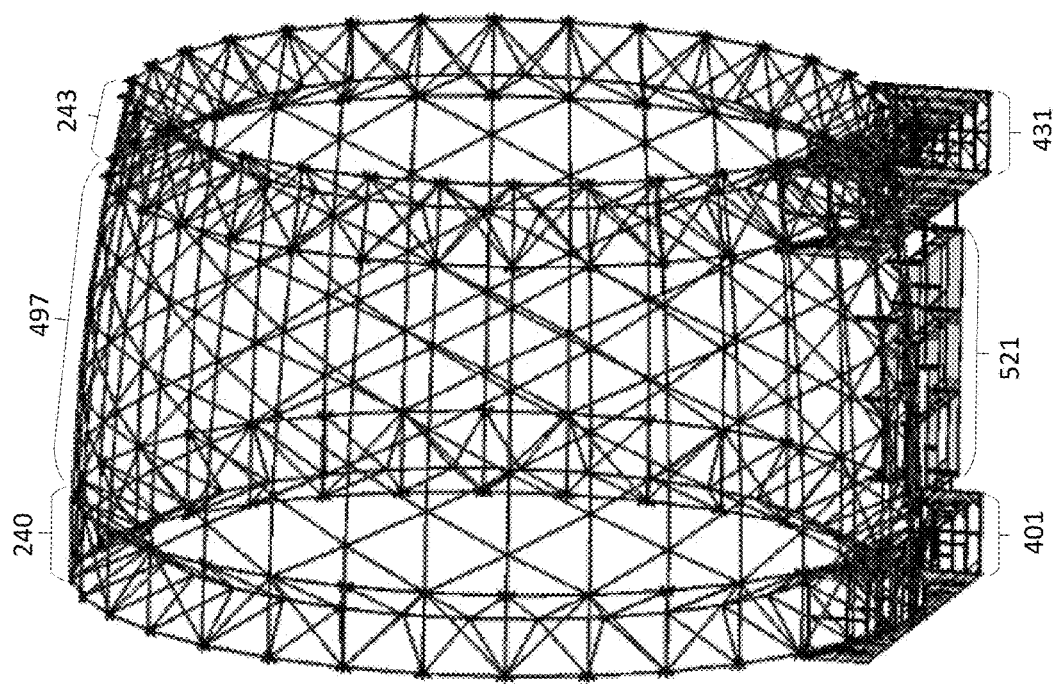
FIGS. 5A-5B illustrate an example of two adjacent mainframes placed on top of two rollercoaster jigs.
Figure 5B:
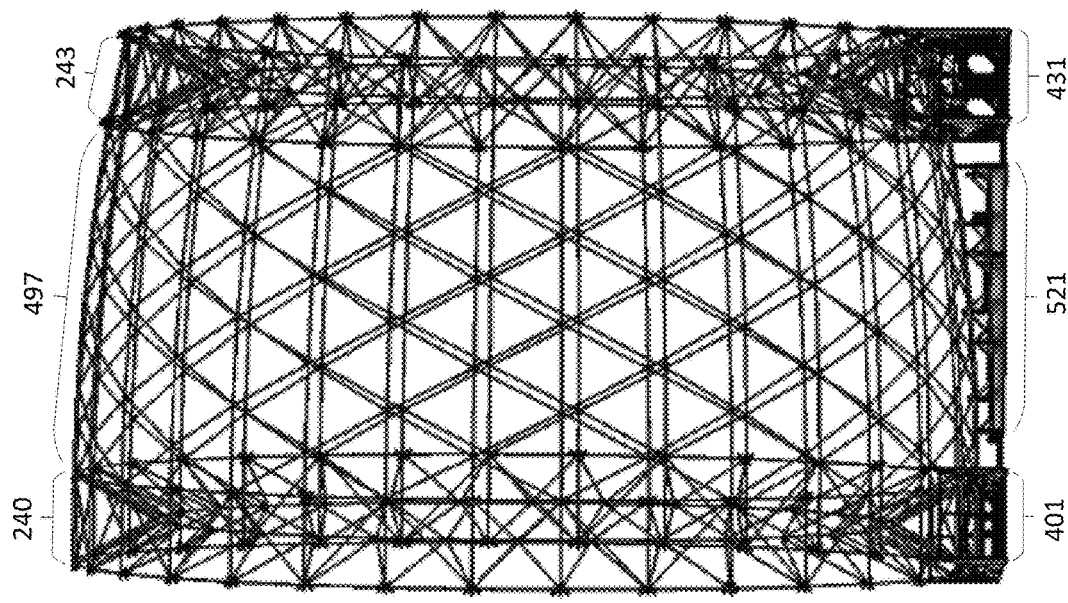

FIGS. 5A-5B illustrate two adjacent mainframes 240 and 243 placed on top of two rollercoaster jigs 401 and 431, respectively. In particular embodiments, two mainframes may be connected to each other with a geodesic structure after the mainframes are erected on top of rollercoaster jigs. The process of connecting two mainframes may start by connecting the bottom portions of the mainframes with each other (e.g., portions that are closest to the ground, or portions that are sitting on top of the rollercoaster jigs). Once the bottom portions are connected, the mainframes may be synchronously rotated to allow subsequent portions of the mainframes to be connected. This process may be repeated until all portions of the mainframes are connected to each other. For example, FIGS. 5A and 5B illustrate two mainframes 240 and 243 that have been fully connected using this method. This method allows the entire process of connecting mainframes to take place on the ground level, which, as discussed above, improves the safety and speed of the construction in comparison to conventional methods. The method of assembling mainframes on rollercoaster jigs, as described herein, may be used to connect more than two mainframes together.

In particular embodiments, mainframes erected on rollercoaster jigs may need to be aligned (e.g., positioned to be concentric with each other) for synchronous rotation, for example, when the mainframes differ in size from each other. For example, as illustrated in FIG. 5B, rollercoaster jig 431 holding up mainframe 243 is raised slightly higher than rollercoaster jig 401 because mainframe 243 is smaller in size than mainframe 240. This adjusts the relative positioning of the two mainframes 240 and 243 so they are concentric with each other. In particular embodiments, rollercoaster jigs may be adjusted to accommodate the tapering of mainframes. For example, FIG. 5B illustrates one side of rollercoaster jig 431 (e.g., the outer side) adjusted higher than the other side (e.g., inner side) to accommodate the tapering of mainframe 243. In particular embodiments, geodesic structures may also be tapered. For example, as illustrated in FIG. 5B, mainframes 240 and 243 are connected by a tapered geodesic structure 497.

Figure 6A:
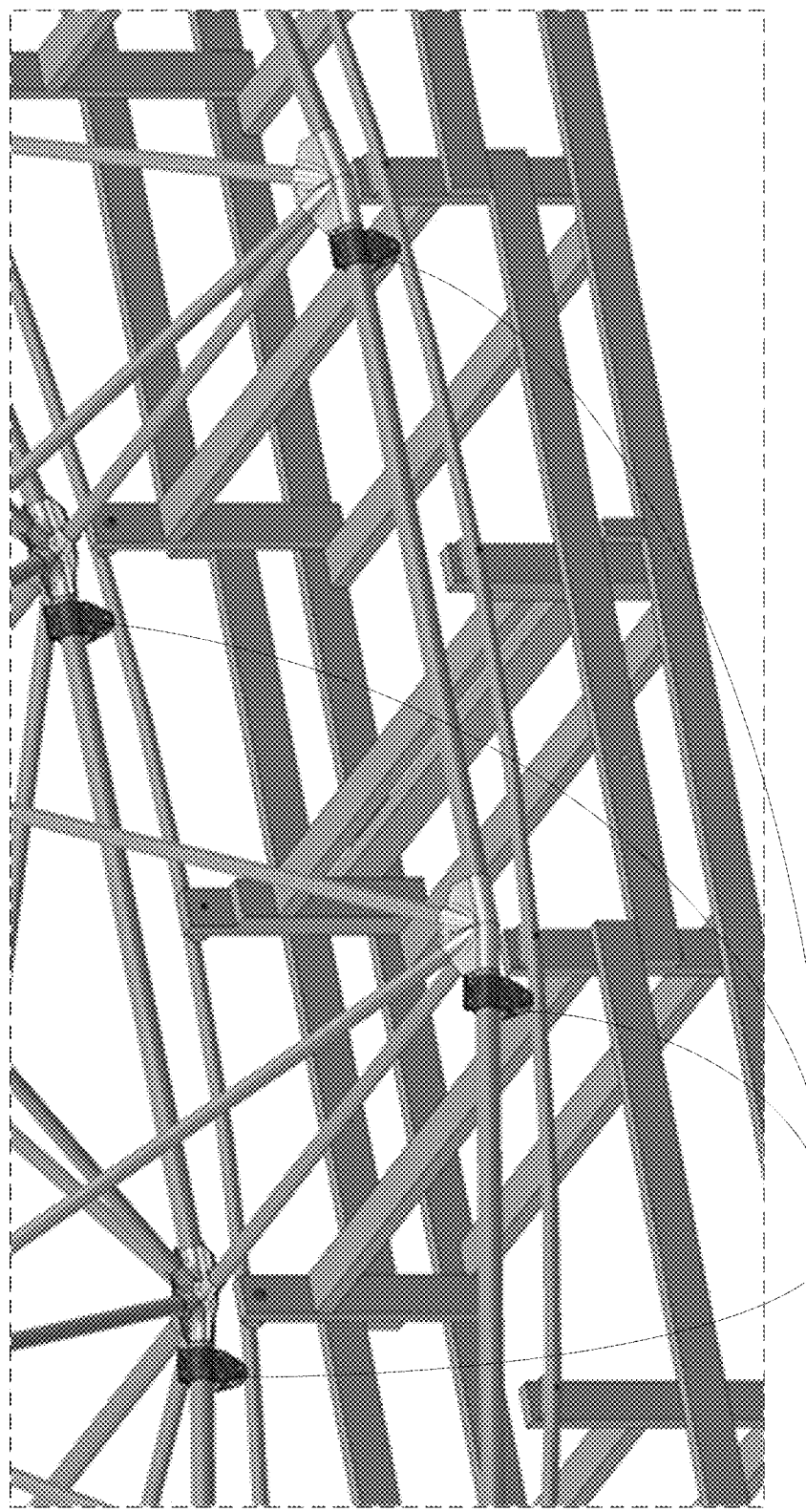
FIGS. 6A-6B illustrate an example of wheel attachments coupled to a mainframe.
Figure 6B:
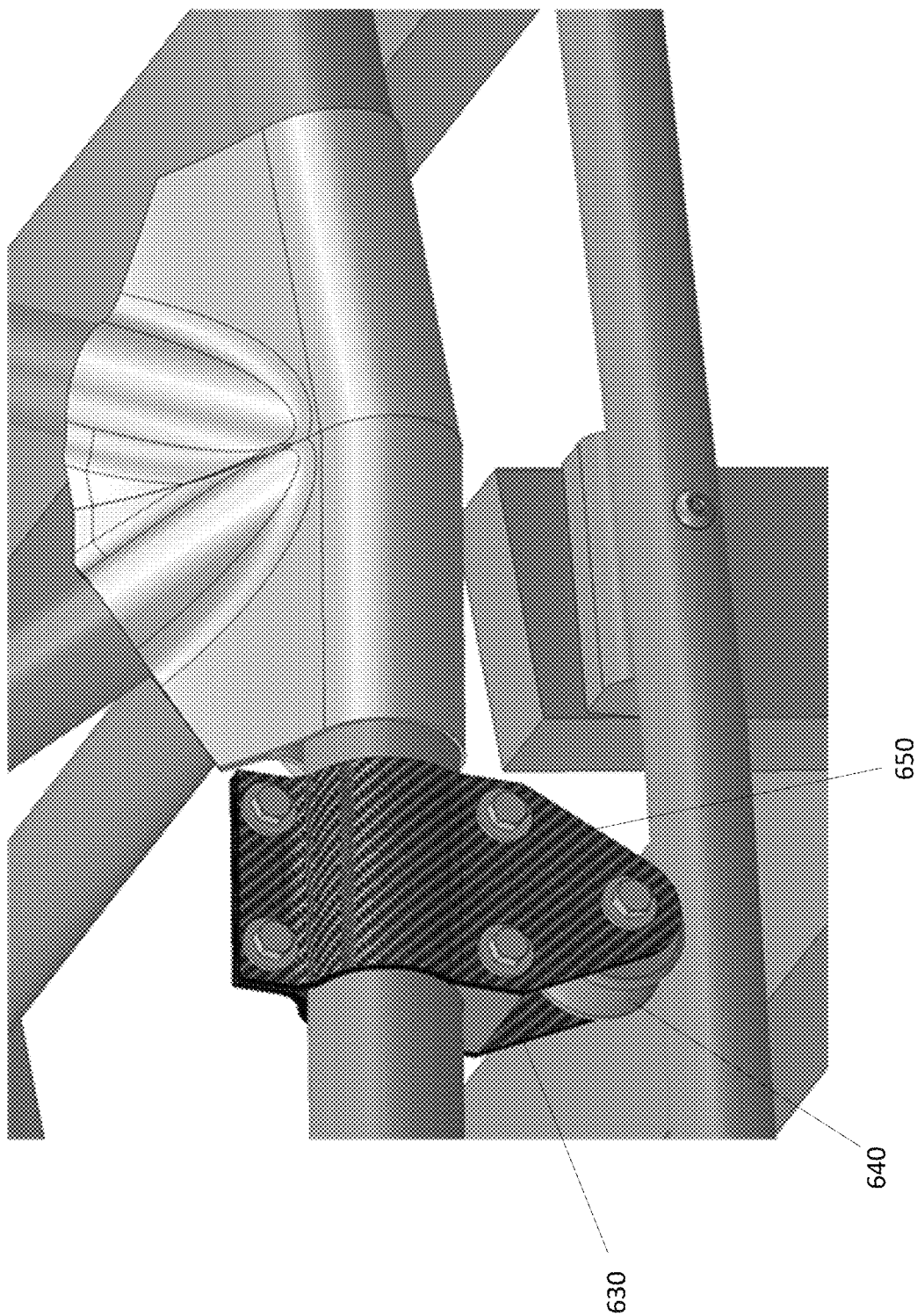

In particular embodiments, the outer circumference of a mainframe may be configured with wheel attachments to allow the mainframe to rotate on top of a rollercoaster jig. For example, FIGS. 6A-6B illustrate an example of wheel attachments 630 coupled to a mainframe erected on a rollercoaster jig. Wheel attachments 630 may be affixed at or near each base joint of the mainframe, as illustrated in FIG. 6A. In particular embodiments, wheels 640 may have a concave surface to improve its fit on top of convex rails. In embodiments such as those illustrated in FIG. 6B, wheels 640 may have a convex surface to fit over concave rails (the concavity of the rails may form a channel in which the wheels may be placed). In particular embodiments, housing 650 for the wheel 640 may be manufactured using carbon-fiber twills. In particular embodiments, housing 650 may be manufactured using 3D-printed molds. In particular embodiments, screws may be used to affix housing 650 to a mainframe and wheels 640. In another embodiment, two wheels may be attached to opposite ends of an elongated housing. The top side of the housing may have adjustable clamps that may be clamped to the connectors of a mainframe, such as, for example, any connector forming the base of a pyramid structure. Once the airship is constructed, the wheel attachments may be detached from the airship's mainframes.

In particular embodiments, a mainframe may be rotated on a rollercoaster jig manually (e.g., by sliding them across the surface of the rollercoaster jig or by manually cranking a lever to rotate the mainframe on the rollercoaster). In other embodiments, a powered drive unit may be used to facilitate the rotation of a mainframe on a rollercoaster jig. The drive unit may be gas powered, electric powered, or powered by any other form of energy. In particular embodiments, multiple rollercoaster jigs may be arranged side by side, each with a corresponding mainframe. The rollercoaster jigs may be engaged simultaneously to rotate all of the corresponding mainframes. In this way, large sections of an airship body, comprising multiple sections of mainframe, may be rotated for assembly. In particular embodiments, a drive unit attached to each of the multiple rollercoaster jigs may facilitate the rotation. In particular embodiments, the drive units may be synchronized, either mechanically or electronically (e.g., by a central computer) so that each section of mainframe is rotated at the same time and by the appropriate degrees of rotation.

Figure 7:
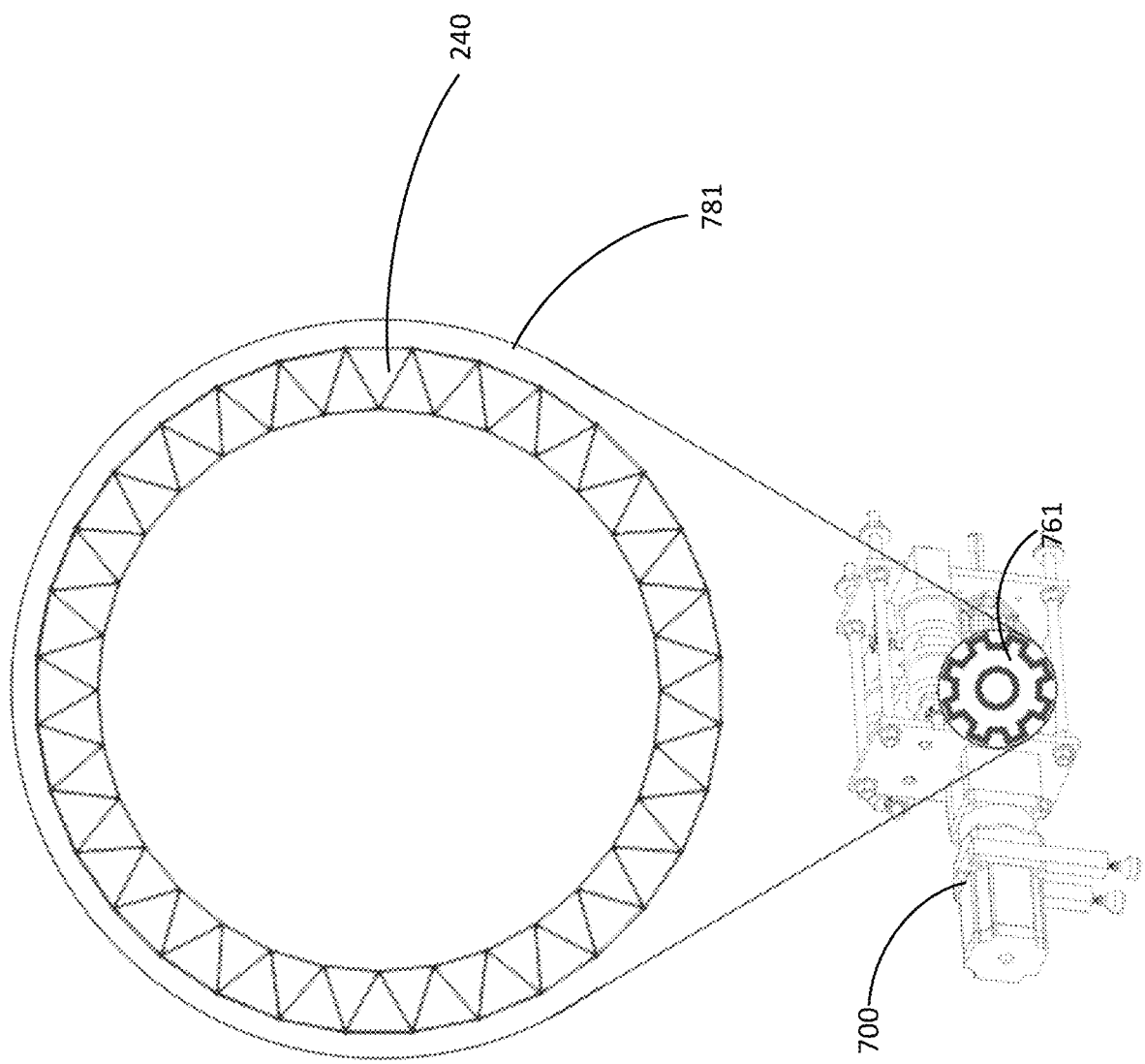
FIG. 7 illustrates a diagram of a belt looped around a mainframe.
Figure 8A:
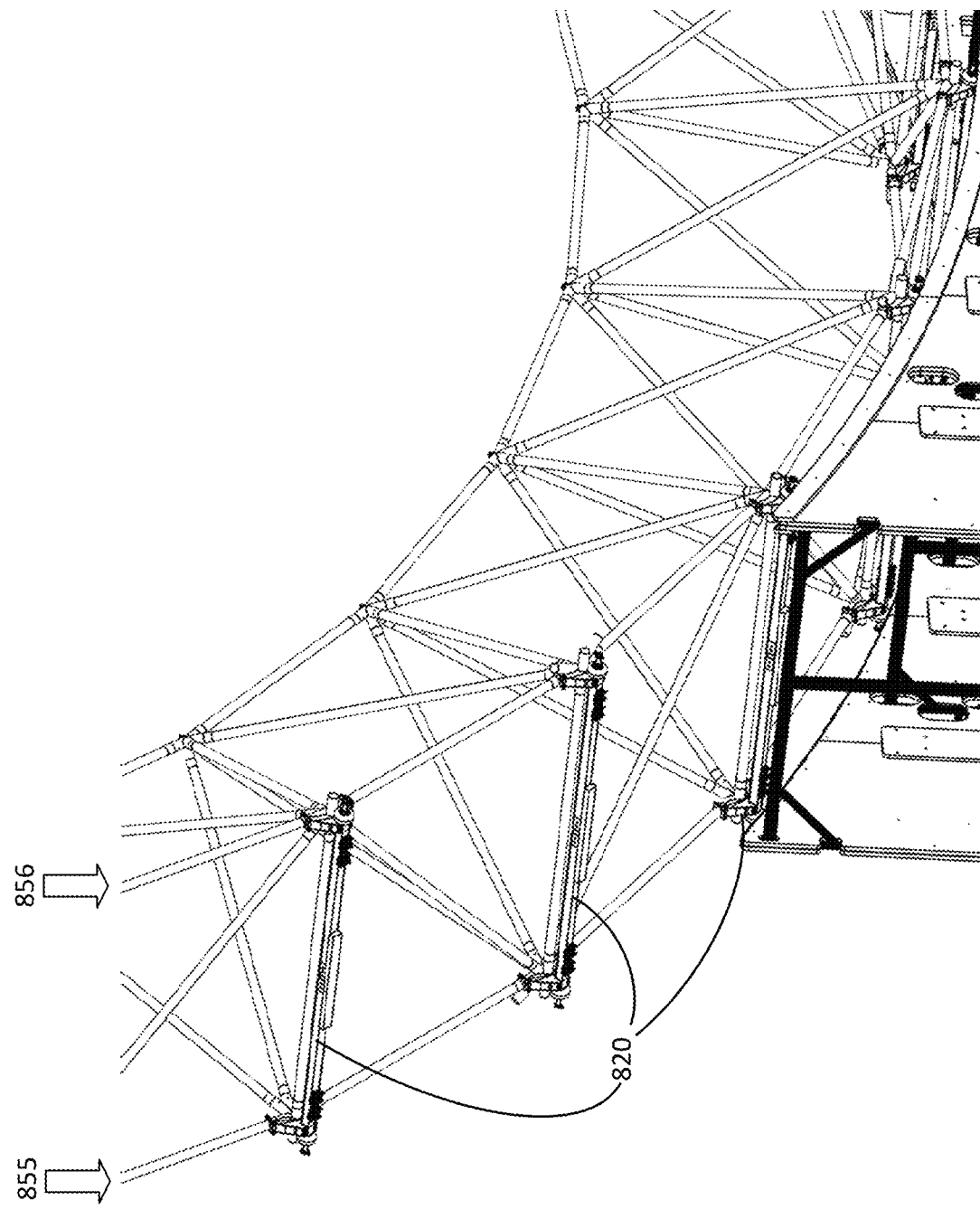
FIGS. 8A-8C illustrate an example belt drive system with anchors.
Figure 8B:
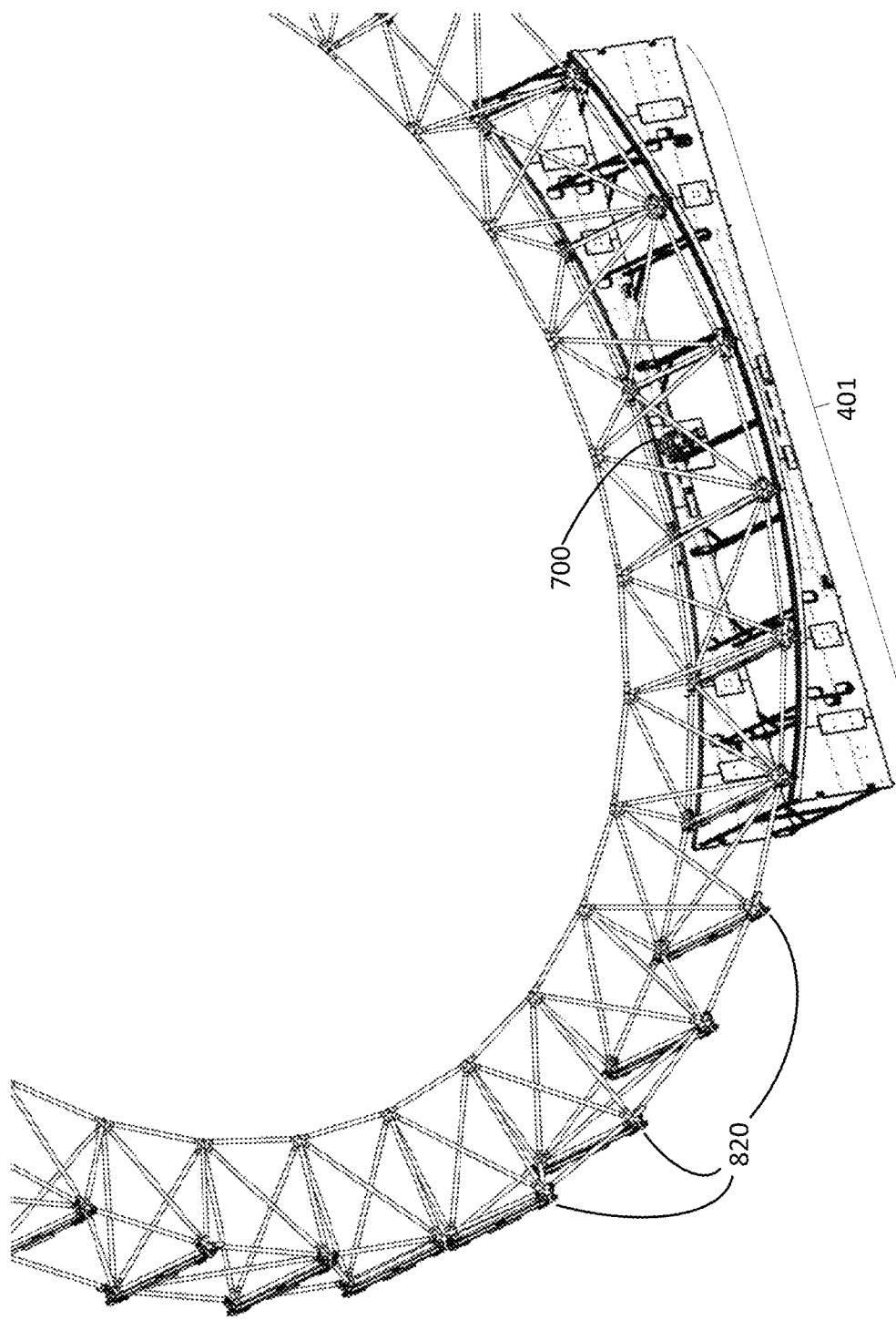
Figure 8C:
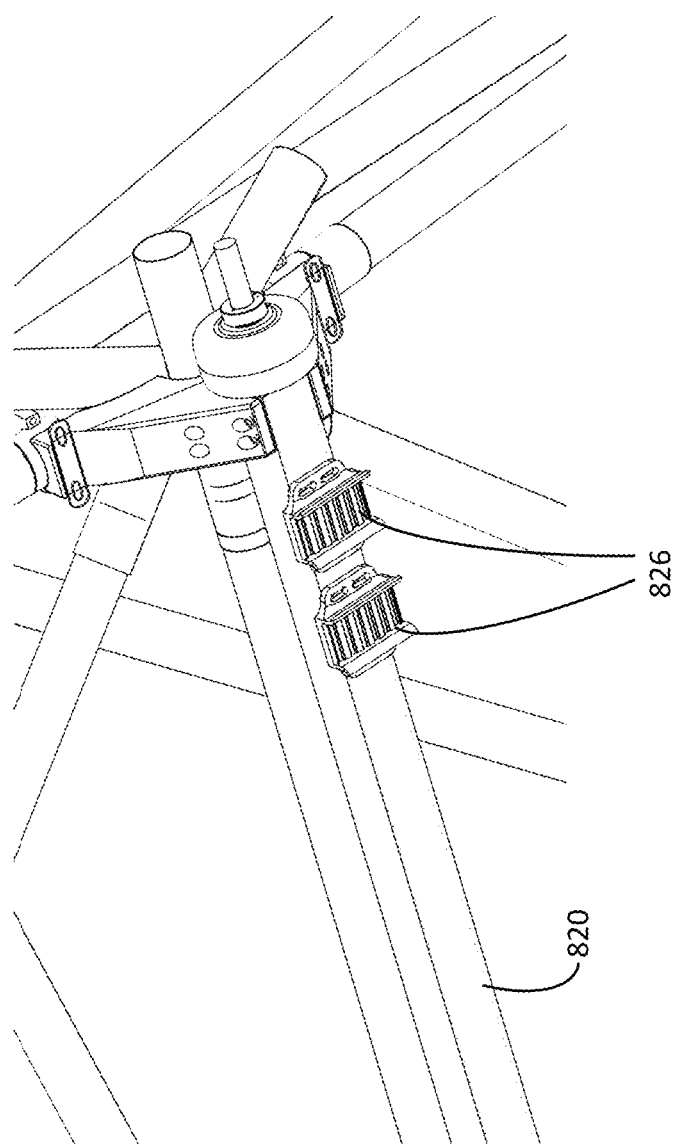

In particular embodiments, a belt drive system may be configured with a rollercoaster jig to rotate the mainframes. The belt drive system may be comprised of a motor, belts, and anchors. The belt drive system rotates a mainframe by looping a belt around the outer circumference of a mainframe and using a motor to drive the belts. For example, FIG. 7 illustrates a diagram of a belt 781 wound around mainframe 240 and the gear 761 of the motor 700. The anchors of the belt drive system, such as the anchors 820 illustrated in FIGS. 8A-8C, may be coupled to the outer circumference of a mainframe, allowing the belts to be secured to the mainframe. For example, FIGS. 8A-8B illustrate anchors 820 coupled to the outer circumference of a mainframe. Anchors may be configured with belt pads to which belts may be secured to. The belt pads may be configured with teeth corresponding to the teeth of the belts to secure the belts to the anchors (e.g., to reduce the risk of the belts slipping). For example, FIG. 8C illustrates an example of belt pads 826 with teeth. Other than the diagram illustrated in FIG. 7, the figures do not illustrate an example of a belt wound around a mainframe. However, referring to FIG. 8A, a belt would be wound around either the left outer circumference 855 of a mainframe (e.g., over the corresponding belt pads) or the right outer circumference 856 of the mainframe. In embodiments where two belts are used in the belt drive system, one of the belts may be wound around the left outer circumference 855 and the other belt may be wound around the right outer circumference 856. Alternatively, as illustrated in FIG. 8C, anchors may be configured with two belt pads on either side of the circumference, allowing two belts to be wound around the same side of the circumference (e.g., either the left outer circumference 855 or the right outer circumference 856).

Figure 9A:
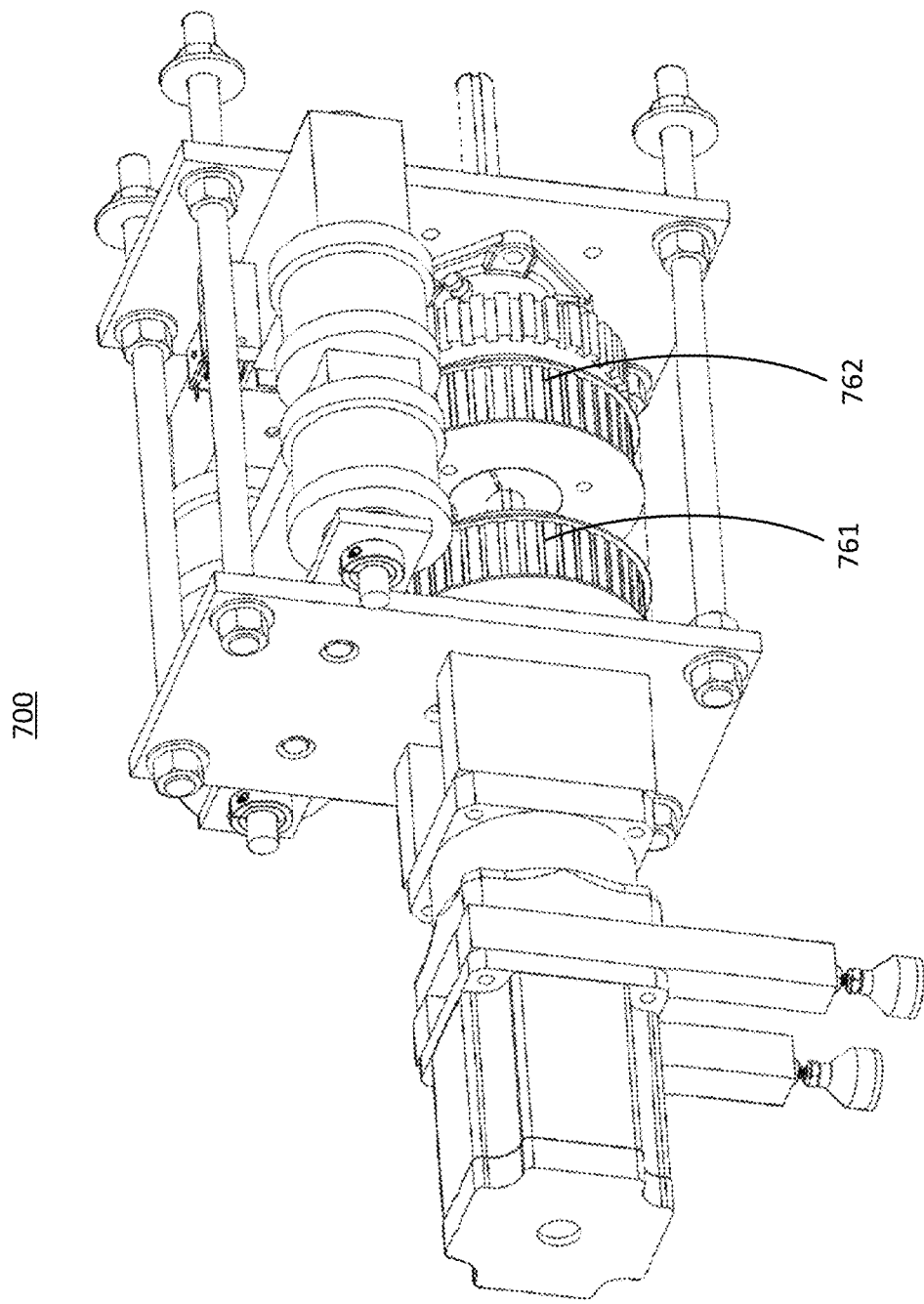
FIGS. 9A-9B illustrate an example motor of a belt drive system.
Figure 9B:
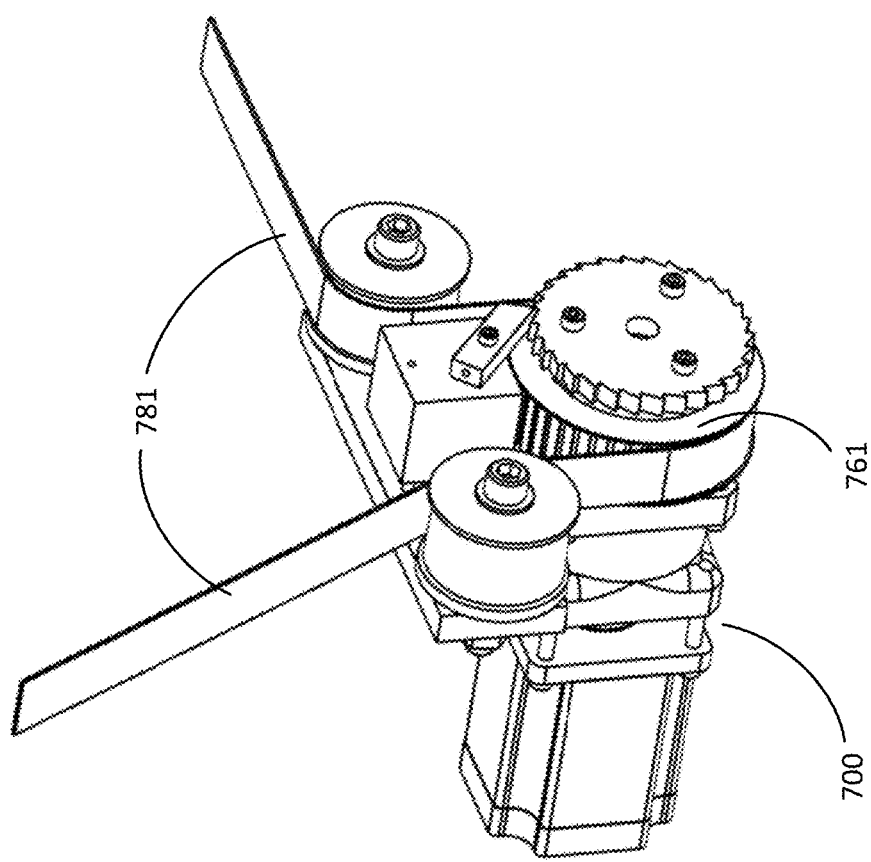

FIGS. 9A-9B illustrate an example of a motor 700 of the belt drive system. FIG. 9A illustrates a stepper motor 700 with gear 761 to which a belt may be looped around. FIG. 9B illustrates a portion of a stepper motor 700 with belt 781 looped around the gear 761. In some embodiments, a DC motor or a servo motor may be used instead of the stepper motor 700. In particular embodiments, the belt drive system may utilize a single belt. In other embodiments, the belt system may utilize two belts. Using a second belt may increase structural integrity of the belt drive system. For example, FIG. 9A illustrates a motor 700 with gears 761 and 762. In particular embodiments, the belts may be non-slipping mechanical drive belts such as timing belts, toothed belts, cogged belts, or synchronous belts. For example, FIG. 9A illustrate gears 761 and 762 configured with teeth, or cogs, to allow belts with corresponding teeth to be utilized.

As discussed above, in order to connect two or more mainframes that have been properly positioned on top of rollercoaster jigs, the mainframes may need to be synchronously rotated. Two or more mainframes erected on top of rollercoaster jigs may be synchronously rotated by controlling the number of steps (e.g., clock signals) driven by the corresponding motors. In particular embodiments, each belt drive system may have a dedicated control unit for controlling the rotation of the corresponding mainframe. For example, in embodiments such as those illustrated in FIGS. 5A-5B, there may be a dedicated control unit for each of the two belt drive systems, one corresponding to mainframe 240 and rollercoaster jig 401 and another for mainframe 243 and rollercoaster jig 431. In particular embodiments, each control units may instruct corresponding motor to rotate the mainframe by a particular number of steps. Each step may correspond to a tooth of the motor's gear or a tooth of the belt.

In particular embodiments, to synchronously rotate multiple mainframes by a particular amount of angular displacement (e.g., degrees of rotation), each of the motors may need to drive its corresponding mainframe by a different number of steps based on the radius of the mainframe. The total number of steps each mainframe requires for any angular displacement may be determined by first calculating the number of steps required to rotate the mainframe by a full rotation (e.g., 360 degrees), then dividing the total number of steps based on the ratio of the desired angular displacement and angular displacement of the full rotation. For example, referring to FIG. 5B, if rotating the mainframes by an angular displacement of 360 degrees for mainframe 240 requires 10 million steps and mainframe 243 requires 12 million steps, then the number of steps the mainframes need to rotate by an angular displacement of 90 degrees is a fourth of the determined number of steps (i.e., the ratio of 90 degrees to 360 degrees), which are 2.5 million steps for mainframe 240 and 3 million steps for mainframe 243. In particular embodiments, each of the control units rotating the mainframes may use similar calculations described above to synchronously rotate the mainframes. In particular embodiments, control units may instruct its corresponding motor to drive the mainframe at different speeds so the mainframes are rotated at the same angular rate. In other embodiments where the control units do not adjust the speed of the motors, the control units may partition its instructions into smaller angular displacements, each partitioned instruction being separated by a delay to allow any mainframe rotating at a slower angular rate to catch up to other mainframes. For example, if the mainframes are to be rotated by 15 degrees, the control units may instruct its corresponding motor to drive the mainframe by 1 degree at a time, each instruction separated by a period of time to allow the mainframe to complete rotating by 1 degree before the next instruction is sent.

Figure 10:
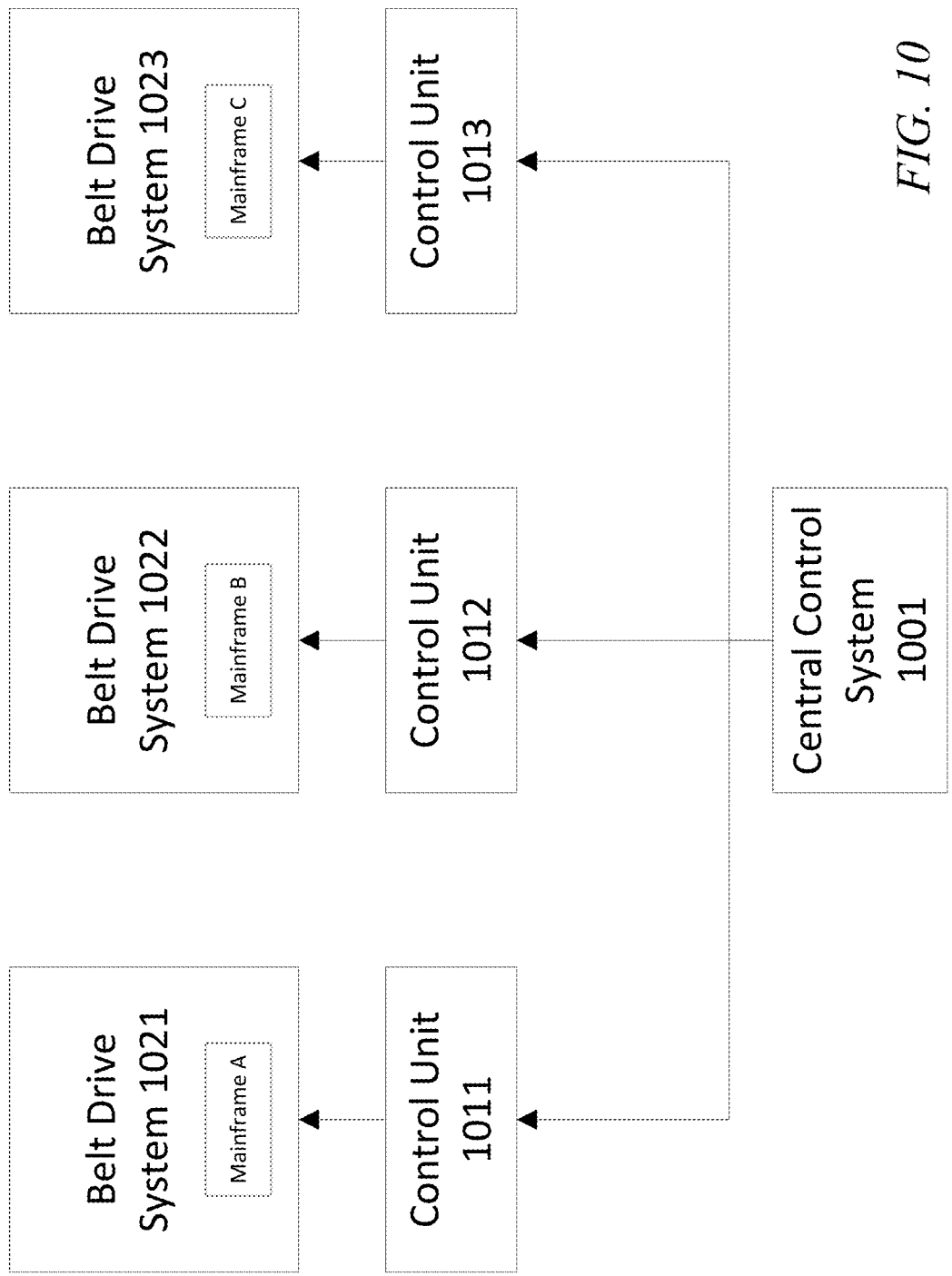
FIG. 10 illustrates a block diagram of a central control system connected to multiple control units.

In particular embodiments, a central control system may be used to synchronize the timing of the rotations of multiple mainframes. For example, FIG. 10 illustrates a block diagram of a central control system 1001 connected to control units 1011, 1012, and 1013, each control unit controlling the rotation of corresponding mainframes A, B, and C. A central control system 1001 may instruct multiple controls units to rotate their corresponding mainframes by a particular amount of angular displacement. Then, as discussed above, each control unit may determine the number of steps to the motor needs to drive its corresponding mainframe to achieve synchronous rotation. In particular embodiments, the central control system may partition its instruction sent to the control units into smaller angular displacements, each partitioned instruction being separated by a delay to allow any mainframe rotating at a slower angular rate to catch up to other mainframes. For example, if the mainframes are to be rotated by 15 degrees, the central control system may instruct its control units to rotate its corresponding the mainframe by 1 degree at a time, each instruction separated by a period of time to allow the mainframe to complete rotating by 1 degree before the next instruction is sent. In other embodiments, the communication channel between the central control system and control units may be bi-directional to allow the control units to communicate to the central control system that it is ready to receive the next instruction. In particular embodiments, the central control system may be located in one of the control units. In particular embodiments, the central control system may be connected directly to the motors such that the central control system could instruct the stepper motors without instructing the individual control units.

In particular embodiments, the geodesic structure illustrated in FIG. 2C may be constructed in portions and attached to mainframes. For example, geodesic structure 497 illustrated in FIGS. 5A and 5B may be constructed in several portions (e.g., 4-12 portions). Each of these portions may be constructed on top of a hull-panel support system 521. Alternatively, each portion may be pre-constructed, then placed on top of the hull-panel support system 521. Once a portion of the geodesic structure 497 has been constructed and placed on top of the hull-panel support system 521, the portion may be attached to mainframes 240 and 243. Once attached, mainframes 240 and 243 may be synchronously rotated so the next portion of the geodesic structure 497 can be attached to the mainframes.

Figure 11A:
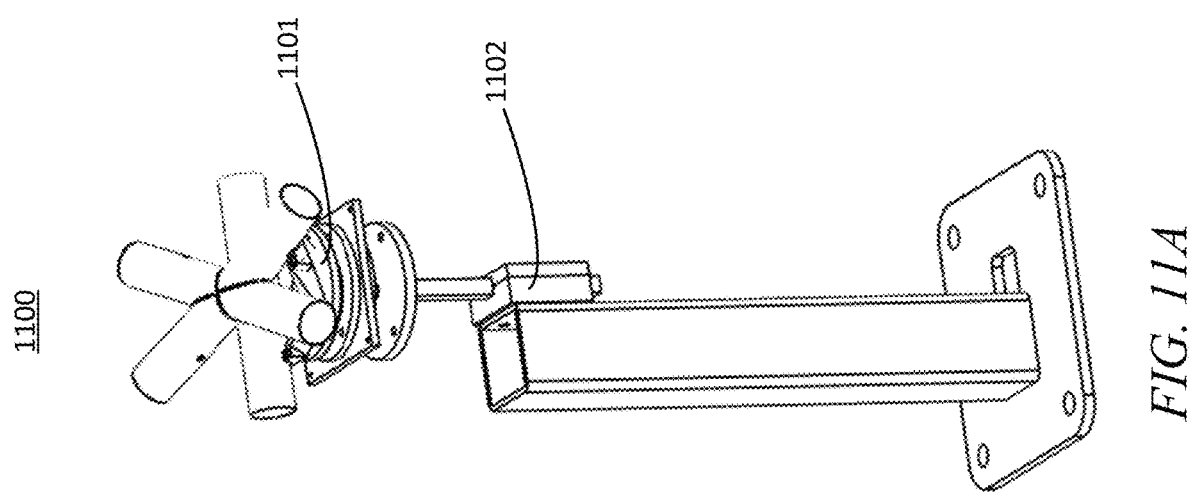
FIGS. 11A-11B illustrate an example of hull-panel towers.
Figure 11B:
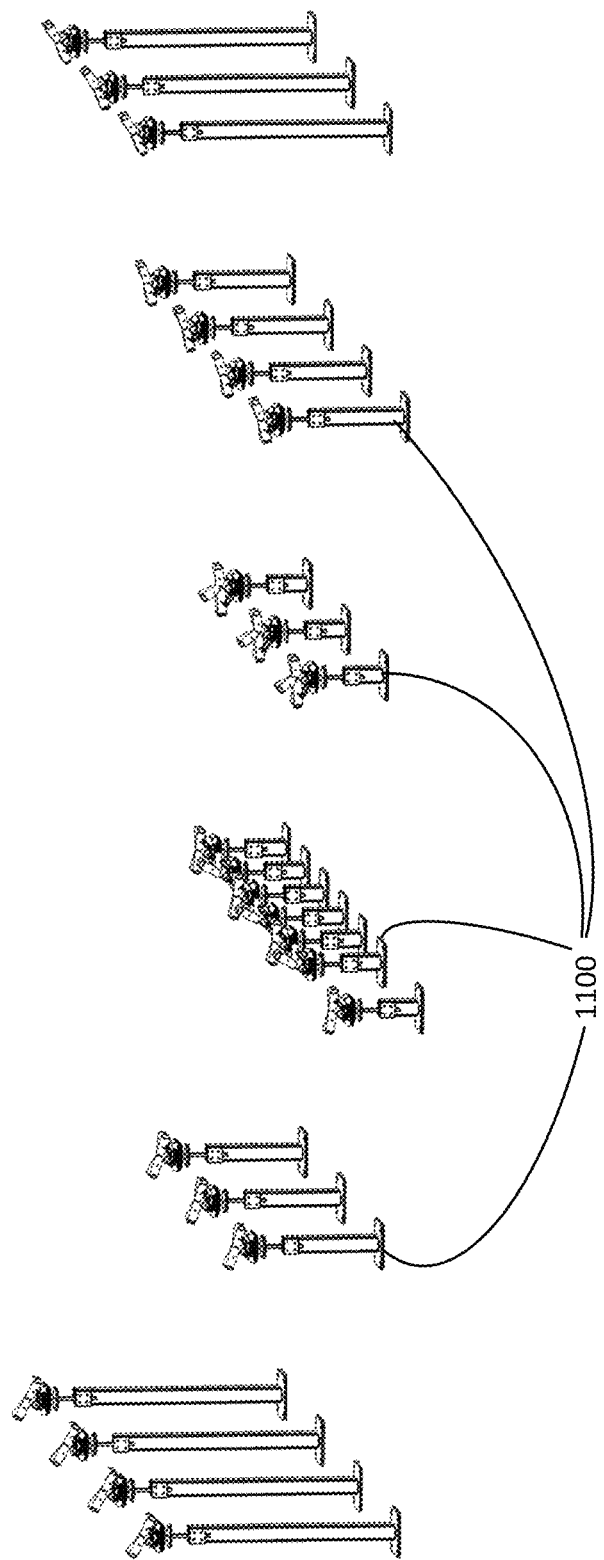

FIGS. 11A-11B illustrate examples of hull-panel towers that may be incorporated into a hull-panel support system. In particular embodiments, a hull-panel tower 1100 may include a cradle 1101 for holding up a joint of a geodesic structure and an adjustable mechanism 1102 for adjusting the height of the cradle 1101. Each cradle may be customized to hold a particular joint of the geodesic structure. FIG. 11B illustrates multiple hull-panel towers 1100 configured in a similar manner as the hull-panel support system 521 illustrated in FIGS. 5A and 5B for supporting portions of a geodesic structure. The hull-panel towers illustrated in FIGS. 11A and 11B are height-adjustable to allow the various configurations of geodesic structures, or portions of, to be placed on top of them.

The apparatuses described above may be used to efficiently and cost-effectively build airships. In particular embodiments, each of the aforementioned joints used in the construction of a rigid airship's frame may be manufactured using molds. In particular embodiments, any of the molds described herein may be manufactured as follows. Each component of a mold (e.g., the male, female, or center piece) may be quickly and cost-effectively created using 3D printers. For instance, a digital 3D model defining a mold component may be sent to a 3D printer for printing. Layer by layer, the 3D printer may "print" the mold component based on its digital model. Any sufficiently strong material may be used, including but not limited to: nylon, ABS plastic, metal, resin, etc. In particular embodiments, the mold component may be solid with 3D-printing material. In other embodiments, the mold component may be designed to have a hollow cavity in the middle, with built-in external openings to the cavity. Once the shell of the mold component has been 3D-printed, cement or other suitable types of material may be injected into the cavity through the openings. Advantages of this process include, e.g., strengthening the mold component beyond what can be offered by the 3D-printing material alone, decreasing 3D-printing time (since less mass is printed), and reducing costs associated with 3D printing. Once the cement hardens, the mold component would be ready for use.

In particular embodiments, the mold components may be used to press against joint materials to create joints for the rigid airship. In particular embodiments, carbon-fiber twills may be used, as they have the desirable properties of being strong, lightweight, rigid, and initially pliable. The carbon-fiber twills may be treated with a hardening agent, such as epoxy resin. Thereafter, layers of twills may be placed between mold components. In particular embodiments, to aid subsequent detachment of the pressed carbon-fiber twills from the mold components, a layer of plastic sheet may be placed between the twills and each mold component. The mold components may then be pressed together so that corresponding portions designed to fit together are aligned with each other. A suitable amount of force may be applied to the molds to maintain their pressed configuration and to shape the carbon-fiber twills until they harden. The force may be applied by, e.g., using clamps, weights, or any other suitable means. Once the carbon-fiber twills harden, the mold components may be separated from each other to allow the carbon-fiber twills to be removed. In particular embodiments, the hardened carbon-fiber twills, which are then joint components, may be trimmed to remove undesirable or unneeded portions.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system for synchronizing rotation of a plurality of mainframes of an airship, the system comprising:
    a plurality of belt drive systems configured to mechanically rotate the plurality of mainframes, respectively;
    a central control system for sending a timing instruction to cause the plurality of mainframes to rotate synchronously about their respective rotational axis, wherein the plurality of mainframes are axis-aligned about their respective rotational axes and the timing instruction specifies a desired angular displacement of the plurality of mainframes; and
    a plurality of control units for controlling the plurality of belt drive systems to rotate the plurality of mainframes, respectively, wherein, for each mainframe of the plurality of mainframes, the associated control unit is configured to:
        receive the timing instruction from the central control system;
        determine, according to the timing instruction, a rotation instruction based on a size of the mainframe and the desired angular displacement; and
        instruct the belt drive system controlled by the control unit to rotate the mainframe based on the rotation instruction.

2. The system of claim 1, wherein, for each of the plurality of belt drive systems, the belt drive system includes a motor for rotating the associated mainframe.

3. The system of claim 2, wherein, for each of the plurality of belt drive systems, the associated motor is a stepper motor, and the rotation instruction specifies a number of steps for the stepper motor.

4. The system of claim 2, wherein, for each of the plurality of belt drive systems, the associated motor is a DC motor or a servo motor.

5. The system of claim 4, wherein, for each of the plurality of belt drive systems, the associated first belt is further wound around a gear of the associated motor.

6. The system of claim 4, wherein, for each of the plurality of belt drive systems, the associated first belt is a non-slipping drive belt.

7. The system of claim 4, wherein, for each of the plurality of belt drive systems, the associated first belt is secured to a plurality of anchors coupled to the outer circumference of the associated mainframe.

8. The system of claim 2, wherein, for each of the plurality of belt drive systems, the belt drive system includes a first belt wound around an outer circumference of the associated mainframe.

9. The system of claim 2, wherein, for each of the plurality of belt drive systems, the associated rotation instruction specifies a speed adjustment for the associated motor based on the size of the mainframe.

10. The system of claim 1, wherein, for each of the plurality of belt drive systems, the associated rotation instruction is partitioned into a plurality of smaller instructions, each smaller instruction separated by a delay to ensure the associated mainframe has a sufficient time to complete its rotation.

11. The system of claim 1, wherein, for each of the plurality of mainframes, the mainframe is erected on a rollercoaster jig for rotating the mainframe.

12. The system of claim 11, wherein each of the rollercoaster jigs corresponding to the plurality of mainframes is height-adjustable, to allow the plurality of mainframes to be axis-aligned about their respective rotational axes.

13. The system of claim 11, wherein each of the plurality of mainframes is coupled with wheels that interface with rails of the corresponding rollercoaster jig.

* * * * *